United States Patent
Akizuki et al.

(10) Patent No.: US 6,698,930 B2
(45) Date of Patent: Mar. 2, 2004

(54) FOIL GAS BEARING

(75) Inventors: Yukio Akizuki, Nagasaki (JP); Akihiko Matsui, Nagasaki (JP); Takero Makino, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/995,682

(22) Filed: Nov. 29, 2001

(65) Prior Publication Data

US 2002/0106138 A1 Aug. 8, 2002

(30) Foreign Application Priority Data

Dec. 1, 2000 (JP) .................................... P2000-367521
Aug. 20, 2001 (JP) .................................... P2001-248727

(51) Int. Cl.[7] ............................................. F16C 17/02
(52) U.S. Cl. ...................................................... 384/106
(58) Field of Search ................................ 384/106, 103, 384/104, 105

(56) References Cited

U.S. PATENT DOCUMENTS 3,809,443 A * 5/1974 Cherubim .................. 384/106
4,118,079 A * 10/1978 Newman et al. ............. 384/100
5,322,371 A * 6/1994 Signoret et al. ............. 384/106
5,634,723 A * 6/1997 Agrawal ..................... 384/106
5,902,049 A * 5/1999 Heshmat ..................... 384/106

FOREIGN PATENT DOCUMENTS

JP        59-93515        5/1984

* cited by examiner

*Primary Examiner*—Lenard A. Footland
(74) *Attorney, Agent, or Firm*—Wenderoth, Lind & Ponack, L.L.P.

(57) ABSTRACT

The present invention is to provides a foil gas bearing which has sufficient damping effects due to a frictional force and a sufficient stiffness to support the rotary shaft. The foil gas bearing has a rotary shaft retainer for retaining a rotary shaft; and a back spring for preventing the displacement of the rotary shaft, which is provided between rotary shaft and rotary shaft retainer. Plural protrusions are formed at one element, which is either the rotary shaft retainer or the back spring. Plural recesses are formed at the other elements, which is either the back spring or the rotary shaft retainer at places which correspond to the protrusions. The protrusions partially fit into the recesses.

13 Claims, 11 Drawing Sheets

FOIL GAS BEARING

BACKGROUND OF THE INVENTION

1. Field of the Invention

The present invention relates to a foil gas bearing which is used in a small gas turbine, a compressor, and the like. In particular, the present invention relates to a foil gas bearing which comprises top foils having a sufficient stiffness to reliably support a rotary shaft.

2. Description of the Related Art

It has been well known that a foil gas bearing is sometimes used as a bearing for supporting a rotary shaft of a gas turbine, a compressor, an expander, and the like. Foil gas bearings are classified into leaf-foil-type gas bearings and bump-foil-type gas bearings.

In the leaf-foil-type gas bearing, a plurality of top foils support the rotary bearing while they are supported by back springs. The top foil is provided in a rotary shaft retainer under conditions in which one end contacts the rotary shaft and the other end is fixed to the rotary shaft retainer, and the one end is more forward than the other end in a rotary direction of the rotary shaft. Specifically, the leaf-foil-type gas bearing will be explained referring to U.S. Pat. No. 4,195,395. FIG. 15 shows the conventional leaf-foil-type gas bearing described in U.S. Pat. No. 4,195,395. In FIG. 15, reference number 1 denotes a rotary shaft, and 2 denotes a leaf-foil-type gas bearing. The rotary shaft 1 is supported by the bearing 2. The bearing 2 comprises a tube shaped rotary shaft retainer 3 and a support ring 4 which is fixed to the inside of the rotary shaft retainer 3. Plural slots 5 are formed around the inside of the support ring 4. A plate shaped top foil 6 is fixed to the support ring 4 under the conditions in which one end is fixed to the slot 5 and the vicinity of the other end contacts the surface of the rotary shaft 1; that is, the top foil 6 is curved so as to partially contact around the rotary shaft 1, and the other end is more forward than the one end in a rotary direction of the rotary shaft 1. Each top foil 6 is supported by a support spring 7 which is fixed to the slot 5 from the outside of the top foil 6 in a radial direction of the rotary shaft 1.

The bump-foil-type gas bearing comprises a top foil and a bump foil in a corrugated plate shape. The bump-foil-type gas bearing supports the rotary shaft using the top foil and the bump foil. The bump-foil-type gas bearing will be explained referring to Japanese Patent Application, Examined Second Publication No. Hei 01-47649 (Japanese Patent Application, Unexamined First Publication No. Sho 59-093515). FIG. 16 shows the conventional bump-foil-type gas bearing disclosed in the Japanese Patent Application, Examined Second Publication No. Hei 01-47649. As shown in FIG. 16, a rotary shaft 11 is provided in a rotary shaft retainer 10. Around the rotary shaft 11, a ring shaped top foil 12 is provided. In addition, between the top foil 12 and the rotary shaft retainer 10, a bump foil in a corrugated plate shape 13 is provided. When the rotary shaft 11 rotates at high speed, air in a space between the rotary shaft 11 and the top foil 12 is involved in a rotation of the rotary shaft 11, and thereby, the rotary shaft 11 floats. In addition, the bump foil 13 has a resiliency, and therefore it exerts damping effects.

In the latter, when the rotary shaft 11 is displaced, the bump foil 13 rubs on the inside of the rotary shaft retainer 10, and thereby a frictional force is generated. Due to the frictional force, the damping effects can be obtained. In order to increase the frictional force, it is necessary to increase the rubbing distance over which the bump foil 13 rubs on the inside of the rotary shaft retainer 10. In addition, in order to increase the rubbing distance, it is necessary to substantially transform the bump foil 13. Due to this, a problem occurs in that the stiffness of the bump foil 13 decreases.

In the former, similar to the latter, in order to increase the damping effects by increasing the rubbing distance between the top foil 6 and the rotary shaft 1, it is necessary to increase the length of the top foil 6. In order to support the top foil 6 having a large length, a support spring 7 having a large length is needed. As a result, a problem occurs in that the stiffness of the support spring 7 decreases.

In addition, in conventional foil gas bearings, in order to decrease the frictional force which is caused by contacting the rotary shaft 1 or 11 and the top foil 6 or 12 when the operation starts or stops, the surface of the rotary shaft 1 or 11 is chrome plated and a calcination film containing fluororesin as a main component is formed on the surface of top foil 6 or 12. However, since the maximum allowable temperature of the calcination film containing fluororesin is low, such as about 200° C., it is difficult to use foil gas bearings comprising the top foils which are coated with the calcination film with elements for gas turbines which are subjected to high temperatures.

The present invention has been realized in consideration of the matters mentioned above, and an object of the present invention is to provide a foil gas bearing which has sufficient damping effects due to a frictional force and a sufficient stiffness to support the rotary shaft.

In addition, another object of the present invention is to provide a foil gas bearing in which a back spring for preventing the displacement of the rotary shaft has a sufficient stiffness to prevent damages to the back spring; and in which a frictional force which is generated by the contact between the rotary shaft and the top foil when the operation starts or stops, decreases.

In addition, another object of the present invention is to provide a foil gas bearing in which the back spring for preventing the displacement of the rotary shaft is easily mounted into the rotary shaft retainer with a high precision, and thereby a bearing clearance between the rotary shaft and the top foil is maintained precisely, and in which the bearing clearance can be adjusted after assembly.

Furthermore, another object of the present invention is to provide a foil gas bearing which has a high maximum allowable temperature and an improved heat resistance, and which can be used for the elements of gas turbines which are subjected to high temperatures.

SUMMARY OF THE INVENTION

In order to achieve the above objects, the present invention provides a foil gas bearing comprising a rotary shaft retainer for retaining a rotary shaft, and a back spring for preventing the displacement of the rotary shaft, which is provided between the rotary shaft and the rotary shaft retainer. Plural protrusions are formed at one element which is either the rotary shaft retainer or the back spring. Plural recesses are formed at the other element, which is either the back spring or the rotary shaft retainer, at places which correspond to the protrusions, and the protrusions partially fit into the recesses.

According to the foil gas bearing, when the rotary shaft is displaced in a radial direction or in a thrust direction thereof, the protrusion which is formed at the back spring (or the rotary shaft retainer) fits the recess which is formed at the rotary shaft retainer (or the back spring). Due to this, a frictional force is generated, and the frictional force has damping effects on the displacement of the rotary shaft. In addition, when a recess and a protrusion fit, a tensile force or a compressive stress is generated at the back spring. Specifically, when the back spring comprises the protrusions, a tensile force is generated. In contrast, when the back spring comprises the recess, a compressive stress is generated. Thereby, the stiffness of the back spring is improved and it is possible to oppose the displacement of the rotary shaft.

In the foil gas bearing, it is preferable to further have a top foil for preventing the displacement of the rotary shaft in the radial direction thereof, which is provided between the rotary shaft and the back spring.

According to the foil gas bearing, when the rotary shaft is displaced in the radial direction thereof and a biasing force is applied to the back spring via the top foil, the protrusion and the recess are fitted together, which are formed at the back spring and the rotary shaft retainer. A frictional force is thereby generated between the recess and the protrusion and damping effects occur for the displacement of the rotary shaft in the radial direction thereof. In addition, when the recess and the protrusion are fitted together, a tensile stress or a compressive stress is generated, and this reliably improves the stiffness of the back spring. Therefore, it is possible to oppose the displacement of the rotary shaft in the radial direction thereof.

In the foil gas bearing, it is preferable for the recess to have a wedge shape and to be formed around the inner surface of the rotary shaft retainer, for the back spring to have a ring shape, and for the protrusion to be formed at the ring shaped back spring so as to protrude outwardly.

According to the foil gas bearing, when the rotary shaft is displaced in the radial direction thereof and a biasing force is applied to the back spring via the top foil, the protrusion which is formed at the back spring fits the recess which is formed at the rotary shaft retainer. Due to this, a frictional force is generated and damping effects occur for the displacement of the rotary shaft. In addition, when the recess and the protrusion are fitted together, a tensile force is generated at the back spring between the protrusions.

In the foil gas bearing, it is preferable for the recess to be formed obliquely such that the bottom of the wedge shaped recess is oriented more forward in the rotation direction of the rotary shaft with respect to a radial line of the rotary shaft on which the center of the recess lies, as viewed from the rotary shaft.

According to the foil gas bearing, since the recess is formed obliquely such that the bottom of the wedge shaped recess is oriented more forward in the rotation direction of the rotary shaft with respect to the radial line of the rotary shaft on which the center of the recess lies, as viewed from the inside of the rotary shaft retainer, due to the turning force of the rotary shaft, the protrusion of the back spring reliably enters the recess of the rotary shaft retainer. Therefore, damping effects for the displacement of the rotary shaft in the radial direction can be reliably obtained.

In the foil gas bearing, it is preferable for the recess to be formed at the back spring so as to protrude toward the center of the rotary shaft, and for the protrusion to be formed at the inner surface of the rotary shaft retainer. In the foil gas bearing, it is more preferable for the recess to have a wedge shape.

According to the foil gas bearing, when the rotary shaft is displaced in the radial direction thereof and a biasing force is applied to the back spring via the top foil, the back spring is pressed toward the outside in the radial direction of the rotary shaft. The recess of the back spring catches the protrusion of the rotary shaft retainer. Then, a frictional force is generated between the recess and the protrusion and damping effects occur for the displacement of the rotary shaft. In addition, when the recess and the protrusion fit with each other, a compressive stress is reliably generated between the protrusions of the back spring.

In the foil gas bearing, it is preferable that plural support members be formed at the outside of the top foil, and that recesses be formed at the support member so as to protrude toward the center of the rotary shaft, that plural protrusions be formed at the back spring so as to protrude toward the center of the rotary shaft at place which corresponds to the recess, and that the protrusion partially fits into the recess.

According to the foil gas bearing, when the rotary shaft is displaced in the radial direction and a biasing force is applied to the back spring via the top foil, the top foil is pressed toward the outside in the radial direction of the rotary shaft. Then, the protrusion formed at the back spring is pressed into the recess formed at the support member. A frictional force is thereby generated between the recess and the protrusion and damping effects occur for the displacement of the rotary shaft in the radial direction thereof. In addition, when the recess and the protrusion fit together, a compressive stress is reliably generated between the protrusions of the back spring.

In the foil gas bearing, it is preferable for the top foil to comprise plural leaf foils of which one end, that is, a base portion, is fixed to the back spring between the protrusions, and for the rotary shaft to be supported by the other end, that is, a tip portion, of the leaf foils.

According to the foil gas bearing, when the rotary shaft is displaced in the radial direction and a biasing force is applied to the back spring via the leaf foils, the protrusion formed at the back spring is pressed into the recess formed at the rotary shaft retainer. Then, when the protrusion is gradually pushed into the recess, a frictional force is generated and damping effects occur for the displacement of the rotary shaft in the radial direction thereof. In addition, when the recess and the protrusion fit with each other, a tensile force is reliably generated between the protrusions of the back spring.

In the foil gas bearing, it is preferable for the back spring to comprise plural recesses which protrude toward the rotary shaft retainer and to be provided in the rotary shaft retainer so as to maintain a gap between the outer surface of the back spring and the inner surface of the rotary shaft retainer between the recesses. The top foil preferably comprises plural top foil elements which are divided in the circumferential direction of the rotary shaft. The top foil element to comprises protrusions which protrude toward the recess of the back spring at one end thereof, and the recess of the back spring and the protrusion of the top foil element to partially fit with each other.

According to the foil gas bearing, when the rotary shaft is displaced in the radial direction and a biasing force is applied to the back spring via the top foil elements, the protrusion formed at the top foil element is pressed into the recess formed at the back spring. Then, when the protrusion is gradually pushed into the recess, a frictional force is generated and damping effects occur for the displacement of the rotary shaft in the radial direction thereof In addition, when the recess and the protrusion fit with each other, a tensile force is reliably generated between the recesses of the back spring. The stiffness of the back spring is thereby improved and it is possible to oppose the displacement of the rotary shaft.

In the foil gas bearing, it is preferable for the back spring to comprise notches at both ends in a longitudinal direction thereof, which notches extend toward the center of the axial line of the rotary shaft.

According to the foil gas bearing, the radial stiffness, that is, the stiffness, for supporting the rotary shaft, of the back spring at both ends in a longitudinal direction thereof can be decreased. If the rotary shaft inclines and a biasing force is applied to the end of the back spring, since the radial stiffness at the end of the back spring is relatively small, the back spring can deform flexibly in response to the biasing stress due to the rotary shaft. The back spring and rotary shaft thereby contact at a large contact area. Therefore, it is possible to avoid applying a large stress at a local portion of the rotary shaft.

In the foil gas bearing, it is preferable for the rotary shaft to comprise a small diameter portion and a large diameter portion with an end face between the small diameter portion and the large diameter portion. The rotary shaft retainer is preferably provided at the small diameter portion; and the back spring is preferably provided between the end face of the rotary shaft and the rotary shaft retainer and has a plate shape.

According to the foil gas bearing, when the rotary shaft is displaced in the thrust direction thereof, the protrusion and the recess, which are formed at the rotary shaft retainer and the back spring, fit with each other. A frictional force is thereby generated and damping effects occur for the displacement of the rotary shaft in the thrust direction thereof In addition, when the recess and the protrusion fit with each other, a tensile force or a compressive stress is generated in the back spring. The stiffness of the back spring is thereby improved and it is possible to oppose the displacement of the rotary shaft.

In addition, in order to achieve the above objects, the present invention provides another foil gas bearing comprising a rotary shaft retainer for retaining a rotary shaft, and a back spring for preventing the displacement of the rotary shaft, provided between the rotary shaft and the rotary shaft retainer. The rotary shaft retainer comprises plural recesses of which the cross section is quadrangular. The back spring comprises plural recesses such that it enters inside of the recesses of the rotary shaft retainer, connection portions between the recesses, and peripheral inclined portions each of which connects the recess and the connection portion which separate them as they extend toward the, rotary shaft so as to form a gap between the outer surface of the connection portion and the inner surface of the rotary shaft retainer. The back spring comprises notches at both ends in a longitudinal direction thereof and at the recess and the peripheral inclined portions and a part of the connection portion, which extend toward the center of the back spring in the longitudinal direction.

In the foil gas bearing, it is preferable to have plural top foils for supporting the rotary shaft provided between the rotary shaft and the back spring. The top foil to comprises a wedge portion comprising an edge and two inclined portions extending from the edge toward the rotary shaft at one end and an extending portion which extends from the wedge portion so as to surround the rotary shaft. It is provided inside of the back spring so that the edge of the wedge portion is inside of the recess formed at the back spring and inclined portions of the wedge portion contact the peripheral inclined portions of the back spring.

In addition, in order to achieve the above objects, the present invention provides another foil gas bearing comprising a rotary shaft retainer for retaining a rotary shaft, and a back spring for preventing the displacement of the rotary shaft, provided between the rotary shaft and the rotary shaft retainer. The rotary shaft retainer comprises plural recesses of which the cross section is quadrangular. The back spring comprises plural recesses which enter inside of the recesses of the rotary shaft retainer, connection portions between the recesses, and peripheral inclined portions each which connects the recess and the connection portion which separate them as they extend toward said rotary shaft so as to form a gap between the outer surface of the back spring and the inner surface of the rotary shaft retainer. The back spring comprises plural notches at the connection portion, which extend toward the center of the back spring in the longitudinal direction.

In the foil gas bearing, it is also preferable to further have plural top foils for supporting the rotary shaft, which are provided between the rotary shaft and the back spring. The top foil to comprises a wedge portion comprising an edge and two inclined portions extending from the edge toward the rotary shaft at one end and an extending portion which extends from the wedge portion so as to surround the rotary shaft. It is provided inside of the back spring so that the edge of the wedge portion is inside of the recess formed at the back spring and the inclined portions of the wedge portion contact the peripheral inclined portions of the back spring.

According to this foil gas bearing, the radial stiffness, that is, the stiffness for supporting the rotary shaft of the back spring at both ends in a longitudinal direction thereof, can be decreased. If the rotary shaft inclines and a biasing stress is applied to the end of the back spring, since the radial stiffness at the end of the back spring is relatively small, the back spring can flexibly deform in response to the biasing stress on to the rotary shaft. The back spring and rotary shaft thereby contact at a large contact area. Therefore, it is possible to avoid applying a large stress at the local portion of the rotary shaft.

In addition, in the foil gas bearing, it is preferable to coat a solid lubricant at the contact surfaces between the back spring and the rotary shaft retainer, and the rotary shaft retainer and the top foil. In addition, it is also preferable to coat the solid lubricant on the rotary shaft.

According to the foil gas bearing, it is possible to control the lubricating conditions between these members and to protect the sliding portions of these members.

In addition, in order to achieve the above objects, the present invention provides another foil gas bearing comprising a rotary shaft retainer for retaining a rotary shaft, a top foil for preventing the displacement of the rotary shaft, which is provided around the rotary shaft, and a back spring for preventing the displacement of the rotary shaft, provided between the top foil and the rotary shaft retainer. The top foil has a thin plate shape and comprises plural top foil elements which are divided in the circumferential direction of the rotary shaft. One end of the top foil element is fixed to the back spring. The back spring has a ring shape formed by fixing both ends of a thin plate at a connection portion under a conditions in which the back spring has a tensile force, wherein one end has a protrusion portion and the other end has a recess portion which catches the protrusion portion, and the width of the protrusion portion substantially equals the width of the recess portion.

According to the foil gas bearing, since the protrusion portion formed at the one end is caught by the recess formed at the other end and the width of the protrusion portion substantially equals the width of the recess portion, and the side surfaces (restriction surfaces) of the protrusion portion contact the inner side surfaces (restriction surfaces) of the recess portion, the protrusion portion cannot move in the width direction of the back spring in the recess portion. In addition, since the protrusion portion of the back spring crosses over the recess portion at the connection portion, the circumferential distance of the back spring can be easily adjusted by varying the cross length between the protrusion portion and the recess portion. In other words, the circumferential extent of the back spring can be easily adjusted by varying the cross point between the protrusion portion and the recess portion. Therefore, it is possible for the back spring to be provided stably in the rotary shaft retainer without a part of the back spring contacting the inside of the rotary shaft retainer. In addition, when the circumferential distance of the back spring varies, since one end of the top foil element is fixed to the back spring, the position of the top foil element changes in the radial direction of the rotary shaft. Therefore, it is possible to maintain a gap between the rotary shaft and the top foil at an appropriate distance by adjusting the circumferential distance of the back spring.

In the foil gas bearing, it is preferable for the rotary shaft retainer to comprise a recess and inclined portions which extend toward the rotary shaft from both ends of the recess in the circumferential direction. The back spring is preferably provided in the rotary shaft retainer so that the vicinity of the connection portion contacts the inclined portions of the rotary shaft retainer and the cross point between the protrusion portion and the recess portion is in the recess formed in the rotary shaft retainer.

According to the foil gas bearing, since the vicinity of the connection portion of the back spring contacts the inclined portions of the rotary shaft retainer, the back spring can be positioned exactly with respect to the rotary shaft retainer. In addition, since the cross point between the protrusion portion and the recess portion is in the recess formed in the rotary shaft retainer, there is a space sufficient to adjust the position of the cross point and the cross point can be adjusted easily with high precision, and the gap between the rotary shaft and the top foil can also be adjusted easily with high precision.

In the foil gas bearing, it is preferable to further have a back spring diameter adjusting mechanism comprising an adjusting groove which is provided at the inner surface of the rotary shaft retainer and a pressing piece which is provided in the adjusting groove and moves outwardly and inwardly in the radial direction of the rotary shaft.

In the foil gas bearing, it is preferable for the rotary shaft retainer to comprise plural recesses and inclined portions which extend toward said rotary shaft from both ends of said recess in the circumferential direction at the inner surface, for the back spring to comprise plural protrusion portions which protrude toward said rotary shaft retainer, and for the back spring to be provided in the rotary shaft retainer so that the protrusion portions contacts the inclined portions of the rotary shaft retainer.

In the foil gas bearing, it is preferable to further comprise plural back spring diameter adjusting mechanisms, for the pressing piece of the back spring diameter adjusting mechanism to comprise a recess which opens toward said rotary shaft and a tapered surfaces which are formed at the both sides of the recess in the circumferential direction of the rotary shaft, for the back spring to have plural protrusion portions and to be provided said rotary shaft retainer such that the edges of said protrusion portions and said connection portion is in the recess of said pressing piece and said protrusion portions and said connection portion contact said tapered portions of said pressing piece.

According to the foil gas bearing, the diameter of the back spring can be adjusted by moving the pressing piece in the radial direction of the rotary shaft. Specifically, when the pressing piece moves inwardly, the diameter of the back spring increases. In contrast, when the pressing piece moves outwardly, the diameter of the back spring decreases. Therefore, the gap between the rotary shaft and the top foil can be adjusted even after the rotary shaft, the top foil, the back spring, and the like are provided in the rotary shaft retainer, and thereby the foil gas bearing is assembled. In addition, the gap between the rotary shaft and the top foil can be adjusted with even higher precision by adjusting the position of the pressing piece. Furthermore, the assembling steps for the foil gas bearing and the adjusting steps for the gap between the rotary shaft and the top foil can decrease.

In the foil gas bearing, it is preferable that plural recesses be formed at the surface of the top foil, which faces to the rotary shaft or the surface of the rotary shaft, or at both the surface of the top foil, which faces to the rotary shaft and the surface of the rotary shaft.

According to the foil gas bearing, since a solid lubricant can be provided in the recesses, the surface of the rotary shaft can be lubricated.

In the foil gas bearing, it is preferable for the top foil to be coated with a film containing at least one selected from the group consisting of graphite and molybdenum disulfide ($MoS_2$).

In addition, in the foil gas bearing, it is preferable for the top foil to be coated with a film containing at least two metallic oxides.

Furthermore, in the foil gas bearing, it is also preferable for the top foil to be coated with a film containing graphite and at least two metallic oxides.

According to these foil gas bearings, it is possible to maintain the coefficient of friction between the rotary shaft and the top foil low in a wide temperature range from the ordinary temperature to high temperatures, such as about 600° C. While the rotary shaft contacts the top foil, such as during starting, during low revolutions, and the like, it is possible to avoid abrasion loss of the rotary shaft and the top foil from increasing over such a wide temperature range. In addition, since the maximum allowable temperature of the top foil increases, it is possible to use the foil gas bearings comprising the top foil for elements for of gas turbines which are subjected to high temperatures.

In addition, in order to achieve the above objects, the present invention provides a foil gas bearing structure comprising a rotary shaft, and a rotary shaft retainer for retaining a rotary shaft, a top foil for preventing the displacement of the rotary shaft; which is provided around the rotary shaft, and a back spring for preventing the displacement of the rotary shaft, which is provided between the top foil and the rotary shaft retainer. The rotary shaft is coated with a hard carbon, and the top foil is coated with a calcination film containing fluororesin.

According to the foil gas bearing structure, since a hard carbon film has solid lubricating properties which are greater than those of a chromium plating film and a ceramic film, a hard carbon film is suitable for coating the surface of the rotary shaft. When the surface of the rotary shaft is coated with hard carbon and the top foil is coated with a calcination film containing fluororesin, transitional lubricating effects can be obtained between the surface of the rotary shaft and the surface of the top foil. In other words, the lubricant at the rotary shaft easily transfers to the surface of the top foil. Therefore, the abrasion resistance of the foil gas bearing is improved, and the service life of the foil gas bearing increases.

In addition, in order to achieve the above objects, the present invention provides another foil gas bearing comprising a rotary shaft retainer for retaining a rotary shaft, a top foil for preventing the displacement of the rotary shaft; which is provided around the rotary shaft, and a back spring for preventing the displacement of the rotary shaft, which is provided between the top foil and the rotary shaft retainer. The top foil is coated with a film containing at least one selected from the group consisting of graphite and molybdenum disulfide ($MoS_2$).

In addition, in order to achieve the above objects, the present invention provides another foil gas bearing comprising a rotary shaft retainer for retaining a rotary shaft, a top foil for preventing the displacement of the rotary shaft, which is provided around the rotary shaft, and a back spring for preventing the displacement of the rotary shaft, which is provided between the top foil and the rotary shaft retainer. The top foil is coated with a film containing at least two metallic oxides.

In addition, in order to achieve the above objects, the present invention provides another foil gas bearing comprising a rotary shaft retainer for retaining a rotary shaft, a top foil for preventing the displacement of the rotary shaft, which is provided around the rotary shaft, and a back spring for preventing the displacement of the rotary shaft, which is provided between the top foil and the rotary shaft retainer. The top foil is coated with a film containing graphite and at least two metallic oxides.

According to these foil gas bearings, it is possible to maintain the coefficient of friction between the rotary shaft and the top foil low over a wide temperature range from ordinary temperatures to high temperatures, such as about 600° C. While the rotary shaft contacts the top foil, such as during starting, during low revolutions, and the like, it is possible to avoid abrasion loss of the rotary shaft and the top foil from increasing over such a wide temperature range. In addition, since the maximum allowable temperature of the top foil is increased, it is possible to use the foil gas bearings comprising the top foil for elements of gas turbines which are subjected to high temperatures.

DESCRIPTION OF THE PREFERRED EMBODIMENTS

Below, preferred embodiments of a foil gas bearing and a foil gas bearing structure according to the present invention will be explained with reference to the figures. The present invention is, of course, not limited to the following embodiments.

First Embodiment

A first embodiment of the present invention will be explained with reference to FIGS. 1 and 2.

Figure 1:
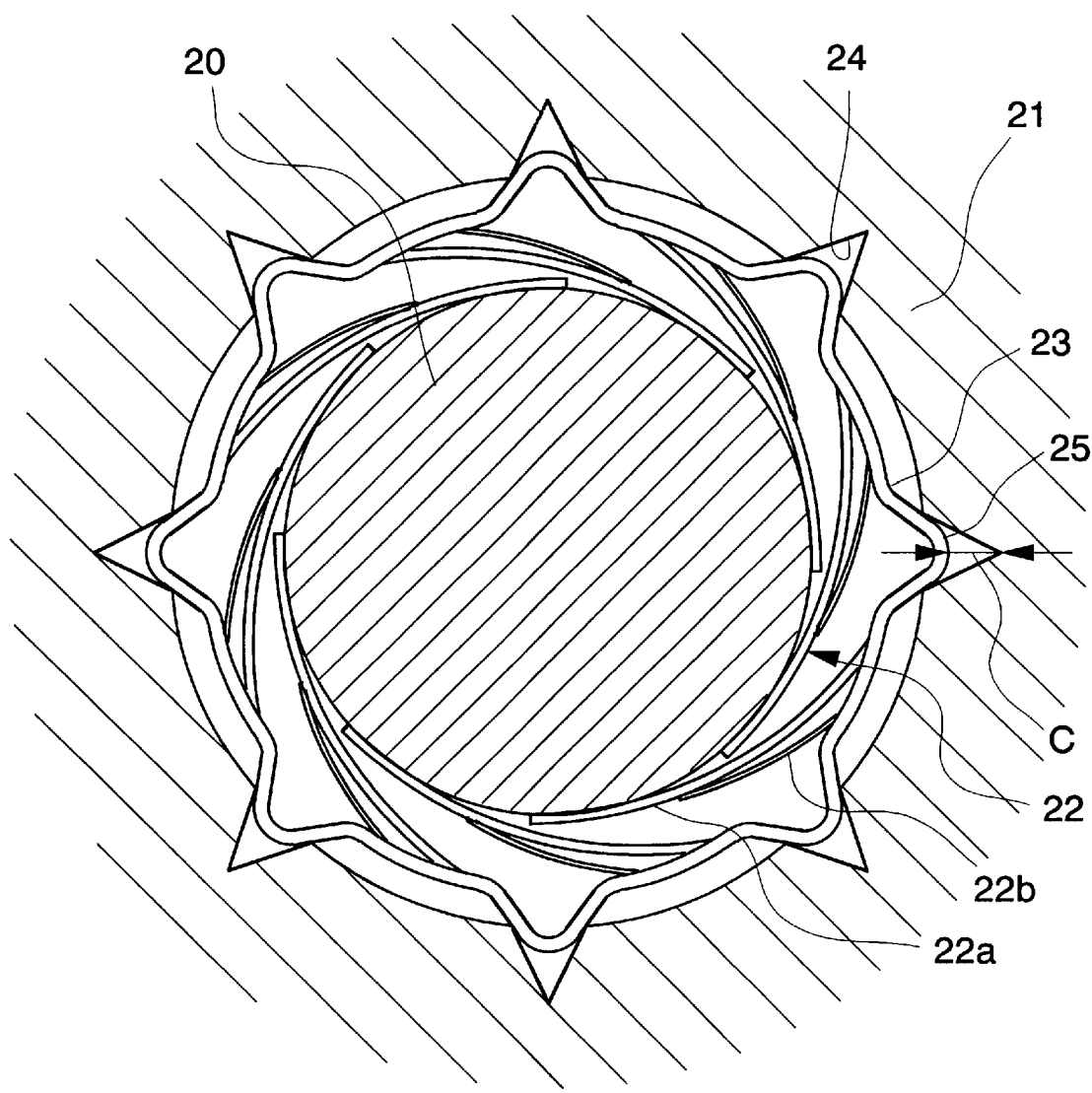
FIG. 1 is a schematic cross-sectional view showing a first embodiment of a foil gas bearing according to the present invention.

The foil gas bearing shown in FIG. 1 is a leaf-foil-type foil gas bearing, and it is used in gas turbines, compressors, and expanders. In FIG. 1, reference number 20 denotes a rotary shaft, 21 denotes a rotary shaft retainer for retaining the rotary shaft 20, 22 denotes a top foil which is provided between the rotary shaft 20 and the rotary shaft retainer 21, and 23 denotes a back spring which is provided between the top foil 22 and the rotary shaft retainer 21. As shown in FIG. 1, the foil gas bearing of this embodiment comprises the rotary shaft retainer 21, the top foil 22, and the back spring 23.

The rotary shaft rotates in a range from 10,000 to 250,000 revolutions per minute. The diameter of the rotary shaft 20 is in a range from 15 to 70 mm. The top foil 22 and the back spring 23 are made of INCONEL alloys, spring steels; such as beryllium steel, or stainless steels.

At the inner surface of the rotary shaft retainer 21, plural wedged recesses 24 are formed so as to maintain a certain interval. The back spring 23 has a ring-like shape, which comprises plural arcuate shaped protrusions 25 so as to correspond to the recesses 24 formed at the inner surface of the rotary shaft retainer 21. These arcuate shaped protrusions 25 of the back spring 23 fit partially into the recesses 24 formed at the rotary shaft retainer 21. In other words, a part of the outer surface of the protrusion 25 contacts the inner surface in the vicinity of the entrance of the recess 24.

Specifically, when the protrusion 25 fits into the recess 24, there is a space C between the top of the protrusion 25 and the bottom of the recess 24. In addition, when the protrusion 25 fits into the recess 24, a frictional force is generated.

The top foil 22, which is provided between the rotary shaft 20 and the back spring 23, comprises plural leaf foils 22a in each of which h as one end is fixed to the back spring 23. Specifically, the base end of the leaf foil 22a is welded and fixed to the back spring 23 between the protrusions 25. The vicinity of the other end supports the rotary shaft 20.

In addition, in this embodiment, support springs 22b are provided at the back spring 23 so as to support the leaf foil 22a from the outside in the radial direction of the rotary shaft 20. One end of the support spring 22b is fixed to the back spring 23.

In general, the foil gas bearing in this embodiment does not need lubrication and maintenance. However, it is possible to protect the contacting portions, such as the surface of the rotary shaft, from abrasions and to control a frictional force by coating the rotary shaft 20, the inner and outer surfaces of the back spring, the inner surface of the rotary shaft retainer 21, and the top foil 22 with solid lubricants, for example, molybdenum disulfide, and double oxide containing chromium ions and potassium ions.

According to the foil gas bearing in this embodiment, when the rotary shaft 20 is displaced in the radial direction thereof and a biasing force is applied to the back spring 23 via the top foil 22, the protrusion 25 of the back spring 23 fits into the recess 24 of the rotary shaft retainer 21. A frictional force is generated between the recess 24 and the protrusion 25 by gradually pressing the protrusion 25 into the recess 24 while the protrusion 25 is deforming. A frictional force causes damping effects for the displacement of the rotary shaft 20 in the radial direction thereof. In addition, when the protrusion 25 fits into the recess 24, a tensile stress is generated between the protrusions 25 formed at the back spring 23 and the stiffness of the back spring 23 is reliably improved. Therefore, it is possible to oppose the displacement of the rotary shaft 20 in the radial direction thereof by the damping effects and the improved stiffness of the back spring 23.

In addition, the back spring 23 of this embodiment is made of one element, that is, it has an integral structure. Therefore, according to the foil gas bearing, it is possible to distribute the load due to the displacement of the rotary shaft 20 over the entire back spring 23.

Moreover, similar to this first embodiment, there is a space C between the top of the protrusion and the bottom of the recess, which are formed in the back spring and the rotary shaft retainer, in the following embodiments.

Figure 2:
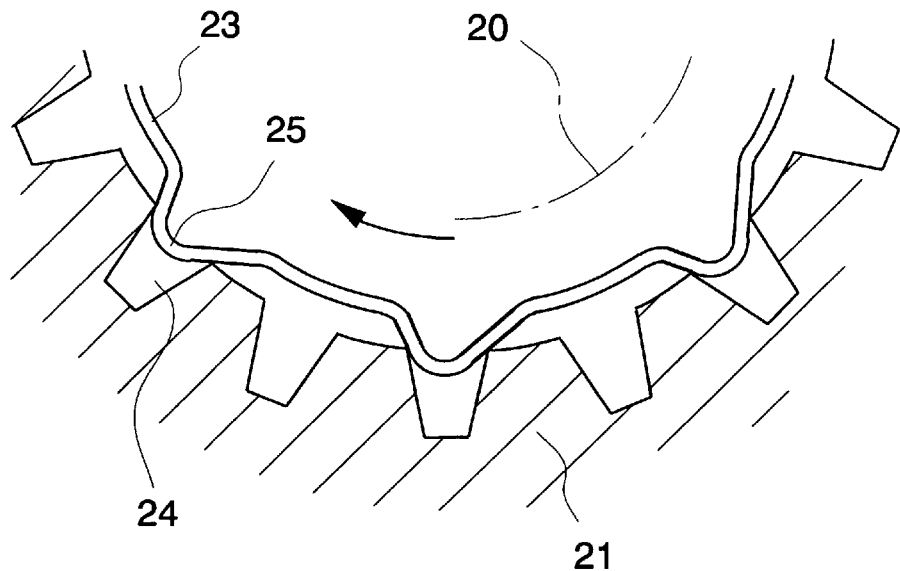
FIG. 2 is a schematic cross-sectional view showing a modification of the first embodiment of a foil gas bearing according to the present invention.

FIG. 2 shows a modification of the embodiment of the foil gas bearing. In the foil gas bearing, splines shaped recesses 24 are formed at the inner surface of the rotary shaft retainer 21, instead of the wedged recesses 24 of the first embodiment. The protrusions 25 of the back spring 23 fit into the alternate splines shaped recesses 24. Castellations foe forming the splines shaped recesses 24 are generally carried out everywhere. Compared with the wedged recess 24 shown in FIGS. 1 and 3, which are formed by special processing, the splines shaped recess can be formed at a relatively low cost.

Second Embodiment

A second embodiment of the present invention will be explained with reference to FIG. 3. The explanation will center on the characteristic parts, and parts which are identical to those in the first embodiment will not be explained further.

Instead of the wedged recesses 24 formed at the inner surface of the rotary shaft retainer 21 in the first embodiment, the recess 24 of this embodiment is formed obliquely such that the bottom of the wedge shaped recess 24 is oriented more forward in the rotation direction of the rotary shaft 20 with respect to the radial line of the rotary shaft 20 on which the center of the recess 24 passes, as viewed from the rotary shaft 20. In addition, the protrusions 25 of the back spring 23 are formed so as to correspond to the shape of the recess 24. Specifically, the protrusions 25 of the back spring 23 are also formed obliquely such that the apex of the protrusion 25 is oriented more forward in the rotation direction of the rotary shaft 20 with respect to the radial line of the rotary shaft 20 on which the center of the protrusion 25 passes, as viewed from the inner surface of the rotary shaft retainer 21.

Figure 3:
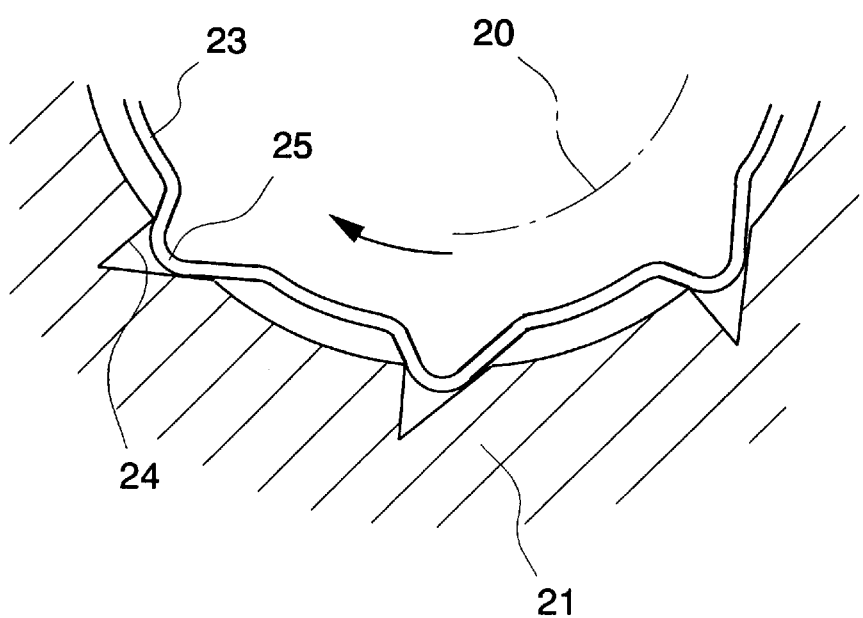
FIG. 3 is a schematic cross-sectional view showing a second embodiment of a foil gas bearing according to the present invention.

According to the foil gas bearing, when the rotary shaft 20 rotates in the direction indicated by the arrow in FIG. 3 and the rotary shaft 20 is displaced in the radial direction thereof, the short side of the protrusion 25 of the back spring 23 contacts the edge formed by the inner surface and the short side of the recess 24 of the rotary shaft retainer 21, and thereby the rotation of the back spring 23 is temporarily stopped. Then, the contact point between the back spring 23 and the recess 24 of the rotary shaft retainer 21 acts as a fulcrum, and the long side of the protrusion 25 slides onto the long side of the recess 24. Thereby, the protrusions 25 are reliably pushed into the recesses 24. Due to this, a frictional force is generated, and damping effects occur for the displacement of the rotary shaft 20. Therefore, compared with the first embodiment, it is possible to obtain larger damping effects in this embodiment.

Third Embodiment

A third embodiment of the present invention will be explained with reference to FIG. 4. The explanation will center on the characteristic parts, and parts which are identical to those in the first embodiment will not be explained further.

Instead of the leaf-type top foils 22 of the first embodiment shown in FIG. 1, a ring shaped top foil 30 is used in this embodiment. Specifically, the ring shaped top foil 30 has a break portion. Air is taken from the break portion and is introduced between the rotary shaft 20 and the top foil 30. The rotary shaft 20 thereby rotates smoothly.

According to the foil gas bearing of this embodiment, when the rotary shaft 20 is displaced in the radial direction thereof and a biasing force is applied to the back spring 23 via the top foil 30, the protrusions 25 of the back spring 23 are fitted into the recesses 24 of the rotary shaft retainer 21. Then, the protrusions 25 are gradually deformed and gradually pushed into the recesses 24 more deeply. A frictional force is thereby generated between the recesses 24 and the protrusions 25 and damping effects occur for the displacement of the rotary shaft 20 in the radial direction thereof. In addition, when the recesses 24 and the protrusions 25 fit with each other, a tensile stress is generated at the back spring 23, and this reliably improves the stiffness of the back spring 23. Therefore, it is possible to oppose the displacement of the rotary shaft 20 in the radial direction thereof.

In addition, according to the foil gas bearing of this embodiment, since the top foil 30 has a ring shape comprising the break portion, air is taken from the break portion and is introduced between the rotary shaft 20 and the top foil 30. The rotary shaft 20 can thereby rotate smoothly.

Fourth Embodiment

Figure 5:
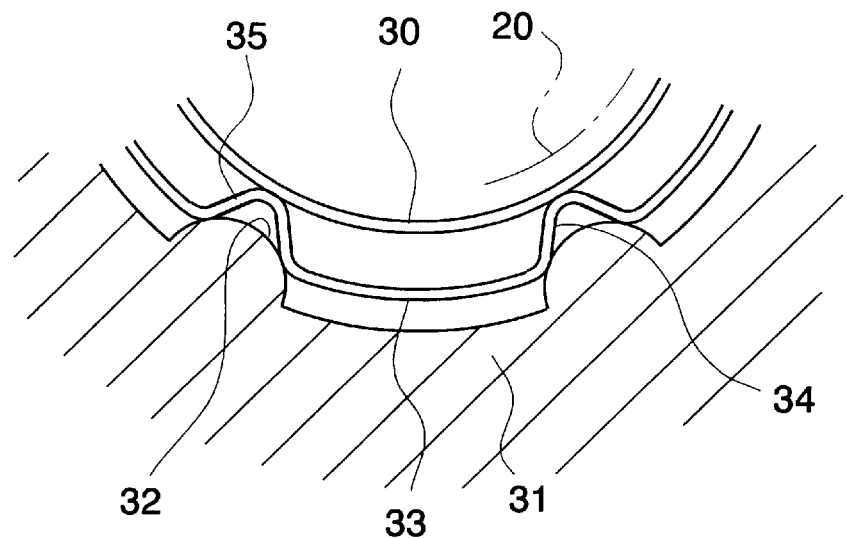
FIG. 5 is a schematic cross-sectional view showing a fourth embodiment of a foil gas bearing according to the present invention.

A fourth embodiment of the present invention will be explained with reference to FIG. 5. The explanation will center on the characteristic parts, and parts which are identical to those in the first embodiment will not be explained further.

Figure 4:
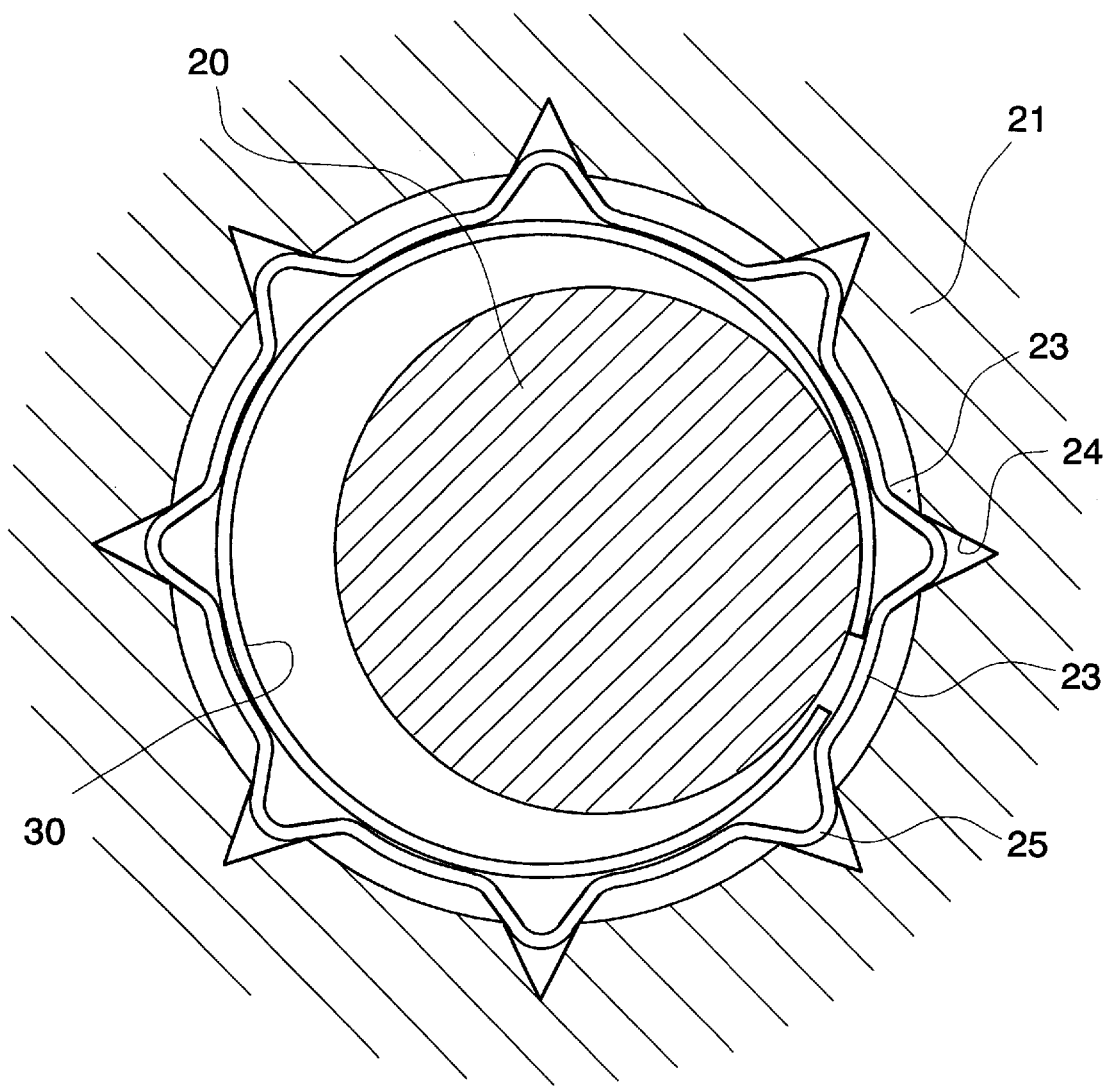
FIG. 4 is a schematic cross-sectional view showing a third embodiment of a foil gas bearing according to the present invention.

This embodiment is a modification of tile foil gas bearing of the third embodiment shown in FIG. 4. In this foil gas bearing, the rotary shaft retainer 31 comprises plural protrusions 32, and the back spring 33 comprises plural recesses 34. Specifically, at the inner surface of the rotary shaft retainer 31, plural arcuate shaped protrusions 32, which protrude toward the rotary shaft 20, are formed so as to maintain a certain interval. At the back spring 33, plural recesses 34 are, formed such that they catch the protrusions 32.

Moreover, the recesses 34 are pushed by the protrusions 32 toward the rotary shaft 20. However, they are pushed back by the top foil 30 which is inside of the back spring 33.

According to the foil gas bearing of this embodiment, when the rotary shaft 20 is displaced in the radial direction thereof and a biasing force is applied to the back spring 33 via the top foil 30, the recesses 34 of the back spring 33 are pushed outwardly in the radial direction of the rotary shaft 20. Thereby, the recess 34 of the back spring 33 catches the protrusion 32 formed at the rotary shaft retainer 31. In other words, the protrusion 32 of the rotary shaft retainer 31 is pushed into the recess 34 of the back spring 33. A frictional force is thereby generated between the recesses 34 and the protrusions 32 and damping effects occur for the displacement of the rotary shaft 20 in the radial direction thereof. In addition, when the recesses 34 and the protrusions 32 fit with each other, a compressive stress is generated between the recesses 34 of the back spring 33, and this reliably improves the stiffness of the back spring 33. Therefore the stiffness of the top foil is also improved. As a result, it is possible to oppose the displacement of the rotary shaft 20 in the radial direction thereof.

Fifth Embodiment

A fifth embodiment of the present invention will be explained with reference to FIG. 6. The explanation will center on the characteristic parts, and parts which are identical to those in the first embodiment will not be explained further.

Figure 6:
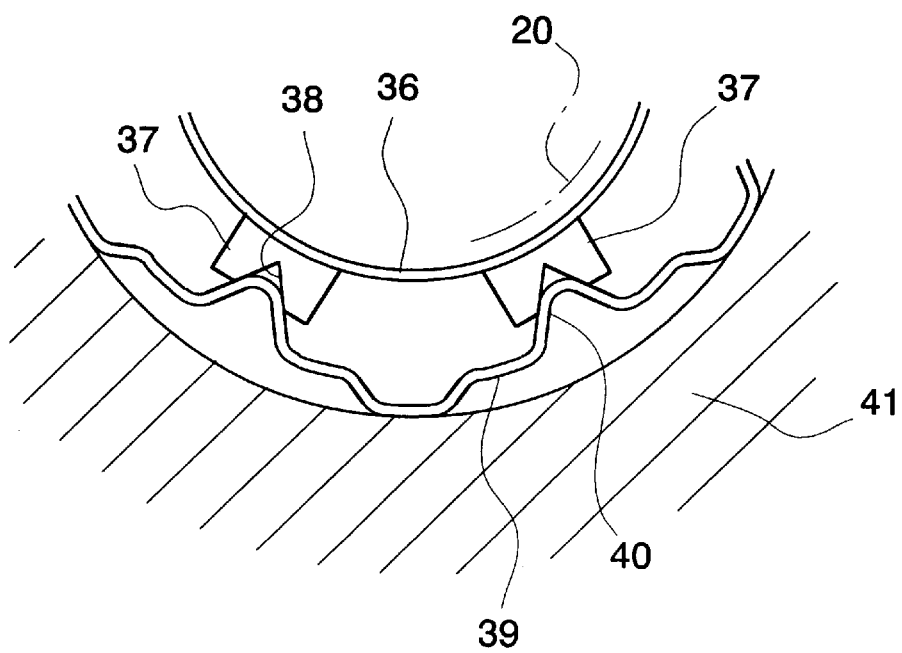
FIG. 6 is a schematic cross-sectional view showing a fifth embodiment of a foil gas bearing according to the present invention.

In this foil gas bearing shown in FIG. 6, plural support members 37 are provided at the outer surface of the top foil 36. At the support member 37, a wedge shaped recess 38, which opens toward the rotary shaft retainer 41, is formed. In addition, plural protrusions 40 are formed at the back spring 39 so as to protrude toward the center of the rotary shaft 20. The protrusions 40 are caught by the recesses 38 of the support members 37. Specifically, the protrusion 40 partially fits into the recess 38 of the support member 37.

In this embodiment, an area between the protrusions 40 of the back spring 39 contacts the inner surface of the rotary shaft retainer 41, and thereby the back spring 39 is supported by the rotary shaft retainer 41. The back spring 39 may be fixed at the rotary shaft retainer 41 by contacting the area between the protrusions 40 to the inner surface of the rotary shaft retainer 41.

According to the foil gas bearing, when the rotary shaft 20 is displaced in the radial direction and a biasing force is applied to the back spring 39 via the top foil 36, the top foil 36 is pressed outwardly in the radial direction of the rotary shaft 20. Then, the protrusion 40 formed at the back spring 39 is pressed into the recess 38 formed at the support member 37. A frictional force is thereby generated between the recess 38 and the protrusion 40 and damping effects occur for the displacement of the rotary shaft 20 in the radial direction thereof In addition, when the recess 38 and the protrusion 40 fit together, a compressive stress is reliably generated between the protrusions 40 of the back spring 39, and this reliably improves the stiffness of the back spring 39. Therefore, the stiffness of the top foil 36 is also improved. Consequently, it is possible to oppose the displacement of the rotary shaft 20 in the radial direction thereof.

Sixth Embodiment

Figure 7:
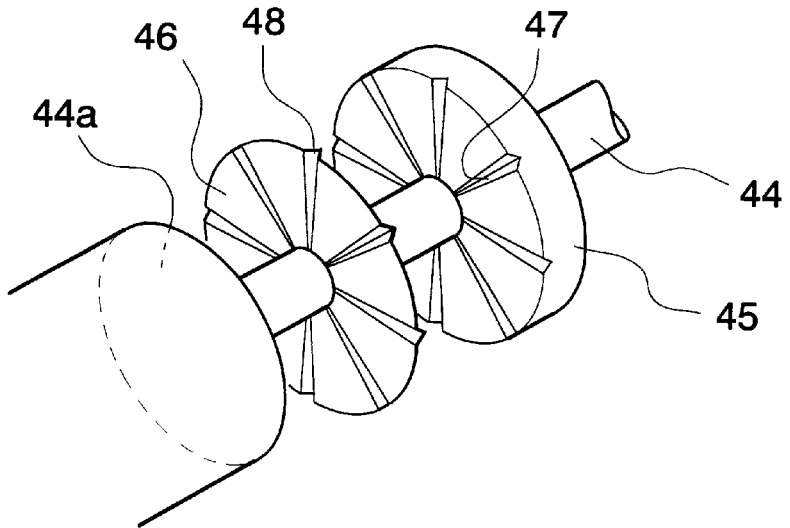
FIG. 7 is a schematic perspective view showing a sixth embodiment of a foil gas bearing according to the present invention.

A sixth embodiment of the present invention will be explained with reference to FIGS. 7 and 8.

The foil gas bearing of this embodiment is a thrust bearing which prevents the rotary shaft 44 from displacing in a thrust direction thereof. Specifically, the foil gas bearing of this embodiment comprises the a rotary shaft retainer 45 for retaining a rotary shaft 44, and the a back spring 46 for preventing the displacement of the rotary shaft 44. More specifically, the rotary shaft retainer 45 retains the rotary shaft 44 by supporting an end surface 44a of the rotary shaft 44 under conditions in which the rotary shaft 44 can rotate freely. The back spring 46 has a disk shape and is provided between the end surface 44a of the rotary shaft 44 and the rotary shaft retainer 45.

Moreover, a member corresponding to the top foil 22 of the first embodiment may be provided between the back spring 46 and the end surface 44a of the rotary shaft 44.

The rotary shaft retainer 45 comprises plural recesses 47 each of which has a wedged cross section at the surface which faces toward the end surface 44a of the rotary shaft 44. The recesses 47 extends in all directions from the vicinity of the center of the rotary shaft retainer 45.

The back spring 46 comprises plural protrusions 48 at places which correspond to the recesses 47 at the surface which faces the rotary shaft retainer 45. Similar to the recesses 47 of the rotary shaft retainer 45, the protrusions 48 extend in all directions from the vicinity of the center of the back spring 46. In addition, when the protrusion 48 of the back spring 46 is viewed from the rotary shaft retainer 45, the protrusion 48 protrudes toward the rotary shaft retainer 45. However, when the protrusion 48 is viewed from the end surface 44a of the rotary shaft 44, the protrusion 48 is inverted so as to form a wedged groove.

When the rotary shaft 44 is displaced in a thrust direction thereof, that is, the axial direction thereof, the protrusions 48 of the back spring 46 fit into the recesses 47 of the rotary shaft retainer 45 under conditions in which the protrusions 48 partially fit into the recesses 47.

According to the foil gas bearing of this embodiment, when the rotary shaft 44 is displaced in the thrust direction thereof, the protrusion 48 of the back spring 46 fits into the recess 47 of the rotary shaft retainer 45. Due to this, a frictional force is generated, and the frictional force has damping effects on the displacement of the rotary shaft 44. In addition, when the recess 47 and the protrusion 48 fit together, a tensile force is generated between the protrusions 48 of the back spring 46. The stiffness of the back spring 46 is improved, and it is possible to oppose the displacement of the rotary shaft 44.

Figure 8:
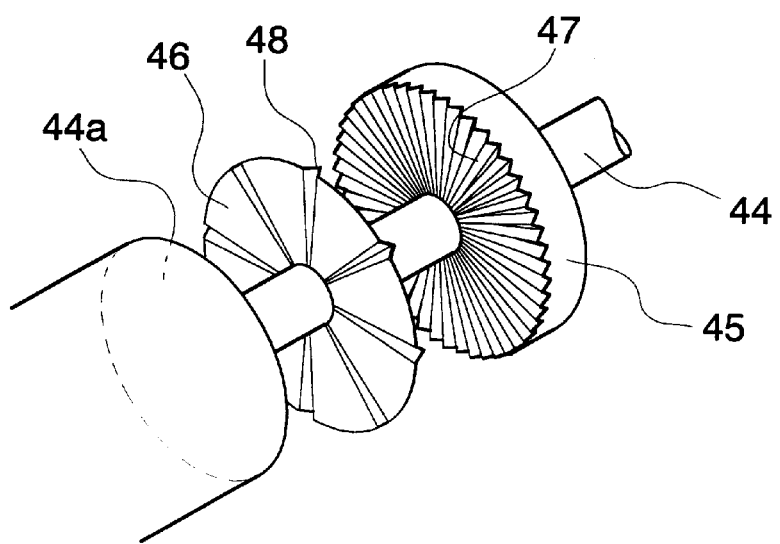
FIG. 8 is a schematic perspective view showing a modification of the sixth embodiment of a foil gas bearing according to the present invention.

In addition, when the recesses 47 of at the rotary shaft retainer 45 are formed so as to have a serrated shape shown in FIG. 8, and the protrusions 48 of the back spring 48 are formed so that one protrusion 48 corresponds to several recesses 47, the cost for manufacturing the foil gas bearing can be reduced.

Seventh Embodiment

A seventh embodiment of the present invention will be explained with reference to FIGS. 9, 10, and 11. The explanation will center on the characteristic parts, and parts which are identical to those in the first embodiment will not be explained further.

In the first embodiment, the protrusions 25 of the back spring 23 fit into the recesses 24 of the rotary shaft retainer 21, and a frictional force which causes the damping effects of the displacement of the rotary shaft 20 is generated between the rotary shaft retainer 21 and the back spring 23. In contrast, in this embodiment, protrusions 53 of the top foil elements 52 fit into the recesses 51 of the back spring 50, and the frictional force is generated between the back spring 50 and the top foil elements 52.

Figure 9:
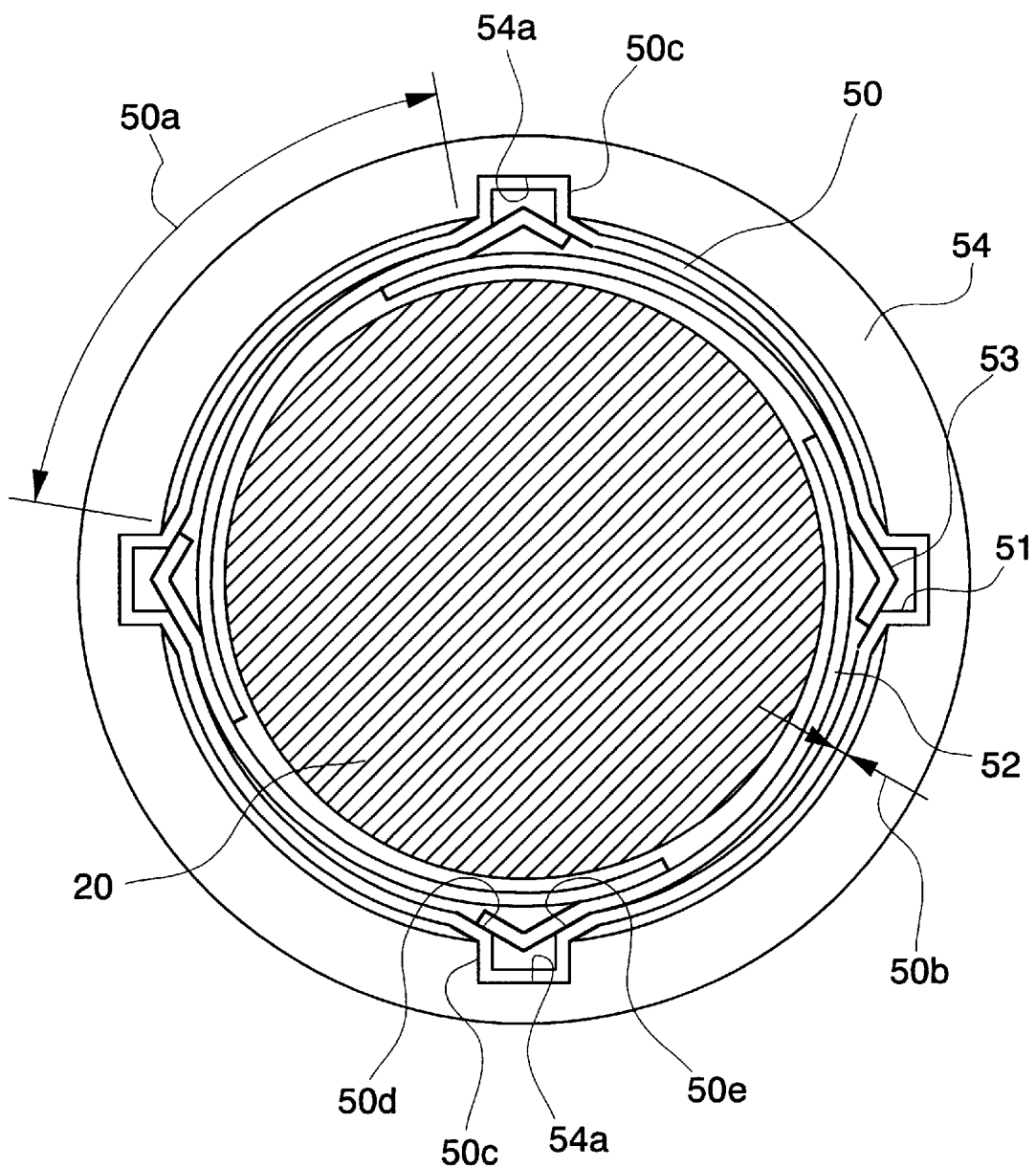
FIG. 9 is a schematic cross-sectional view showing a seventh embodiment of a foil gas bearing according to the present invention.
Figure 10:
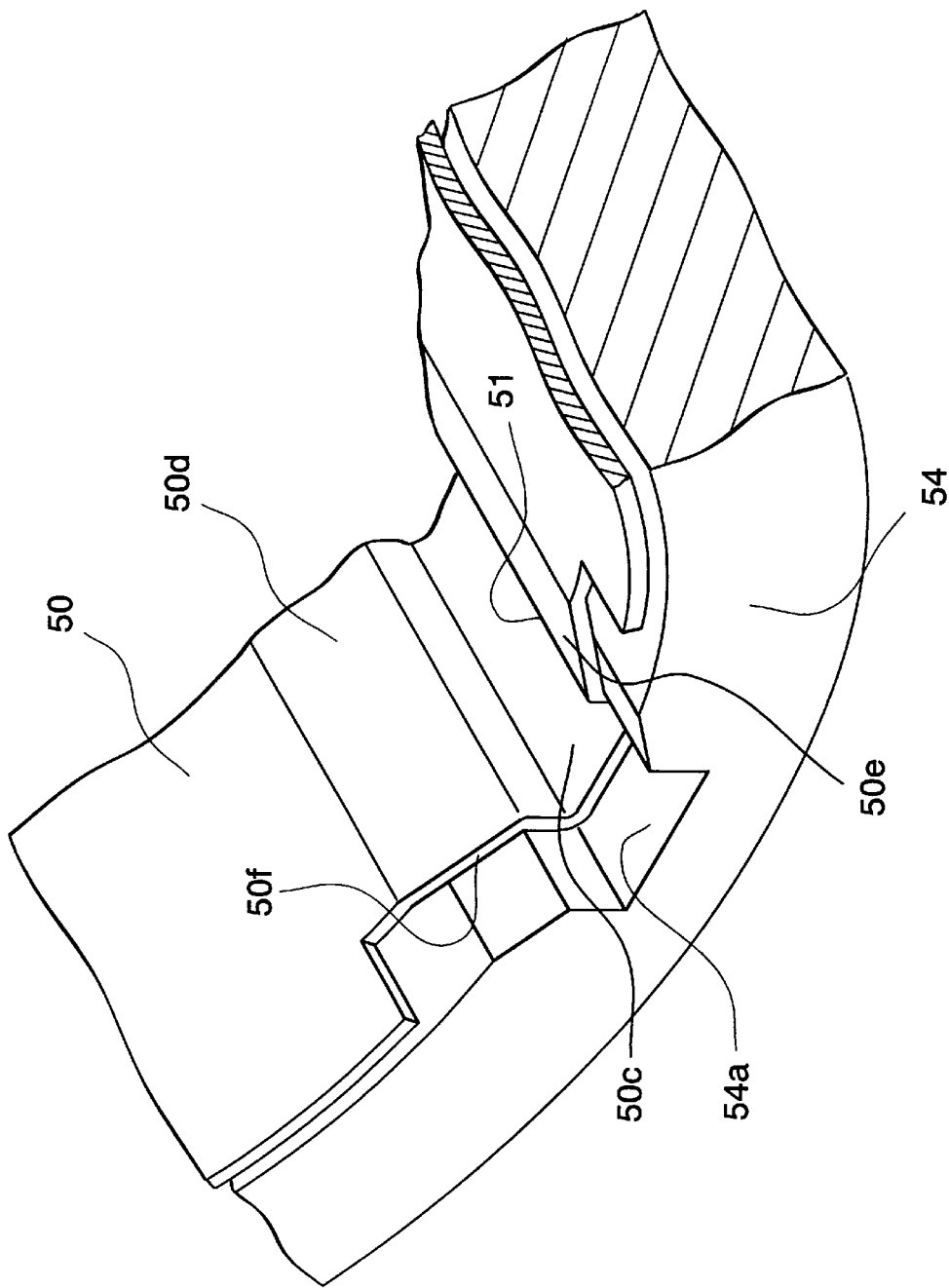
FIG. 10 is a schematic perspective view showing a main part of the seventh embodiment of a foil gas bearing according to the present invention.

As shown in FIG. 9, the foil gas bearing of this embodiment comprises a rotary shaft retainer 54 for retaining the rotary shaft 20, the top foil provided between the rotary shaft 20 and the rotary shaft retainer 54, and the back spring 50 provided between the top foil and the rotary shaft retainer 54.

The rotary shaft retainer 54 comprises plural recesses 54a at the inner surface thereof, which extend in the axial direction of the rotary shaft 20. In this embodiment, the rotary shaft retainer 54 comprises four recesses 54a having a quadrangular cross section spaced so as to maintain a certain interval.

The top foil comprises plural top foil elements 52, which are divided in the circumferential direction of the rotary shaft 20. In this embodiment, the top foil comprises four top foil elements 52. The top foil element 52 comprises the wedge portion 53, that is, the protrusion 53, which protrudes toward the back spring 50 and the extending portion which extends from the wedge portion 53 and which surrounds the rotary shaft 20. The wedge portion 53 comprises two inclined portions which extend from the an edge toward the rotary shaft 20. The extending portion is everted such that it surrounds the rotary shaft 20 and is as far from the inner surface of the back spring 50 as it is from the wedge portion 53. In addition, the extending portion of one top foil element 52 partially overlaps the extending portion of the other top foil element 52.

The back spring 50 comprises the plural recesses 50c that enter inside of the recesses 54a of the rotary shaft retainer 54, the connection portions 50a between the recesses 50c, and peripheral inclined portions 50d and 50e each of which connects a recess 50c and the connection portions 50a. The peripheral inclined portions 50d and 50e extend toward the rotary shaft 20 so as to gradually open, that is, to separate from each other. Due to this, a gap 50b is formed between the outer surface of connection portion 50a and the inner surface of the rotary shaft retainer 54. Moreover, in this embodiment, because the rotary shaft retainer 54 comprises four recesses 54a, the back spring 50 also comprises four recesses 50c.

In addition, the top foil elements 52 and the back spring 50 are formed by a press working, or the like.

The top foil element 52 is provided inside of the back spring 50 by fitting the wedge portion 53 of the top foil element 52 into the recess 50c of the back spring 50. Specifically, the edge of the wedge portion 53 is inside of the recess 50c formed at the back spring 50 and the inclined portions of the wedge portion 53 contact the peripheral inclined portions 50d and 50e of the back spring 50. Moreover, one of the inclined portions of the wedge portion 53 of the top foil element 52 is welded and fixed to one of the peripheral inclined portions 50d and 50e, and the other inclined portions of the wedge portion 53 contacts the other of the peripheral inclined portions 50d and 50e.

According to the foil gas bearing of this embodiment, when the rotary shaft 20 is displaced in the radial direction and a biasing force is applied to the back spring 50 via the top foil elements 52, the wedge portion 53 formed at the top foil element 52 is pressed into the recess 50c formed at the back spring 50. Then, when the wedge portion 53 is gradually pushed into the recess 50c, a frictional force is generated and damping effects occur for the displacement of the rotary shaft 20 in the radial direction thereof. In addition, when the recess 50c and the wedge portion 53 fit together, a tensile force is reliably generated between the recesses 50c of the back spring 50. Thereby, the stiffness of the back spring 50 is improved and it is possible to oppose the displacement of the rotary shaft 20.

The structure, which prevents a biasing force from being applied to the rotary shaft 20 when the rotary shaft 20 is inclined, will be explained below.

The back spring 50 comprises notches 50f at both ends in the longitudinal direction thereof, which notches extend toward the center of the axial line of the rotary shaft 20. As shown in FIG. 10, the notch 50f is formed at the recess 50c, the peripheral inclined portions 50d and 50e, and a part of the connection portion 50a.

According to the foil gas bearing of this embodiment, the radial stiffness, that is, the stiffness for supporting the rotary shaft 20, of the back spring 50 at both ends in the longitudinal direction thereof can be decreased. If the rotary shaft 20 inclines and a biasing stress is applied to the end of the back spring 50, since the radial stiffness at the end of the back spring 50 is relatively small, the back spring 50 can thereby deform flexibly in response to the biasing stress due to the rotary shaft 20. The back spring 50 and rotary shaft 20 thus contact at a large contact area. Therefore, it is possible to avoid the rotary shaft 20 applying a large stress to a local portion.

Figure 11:
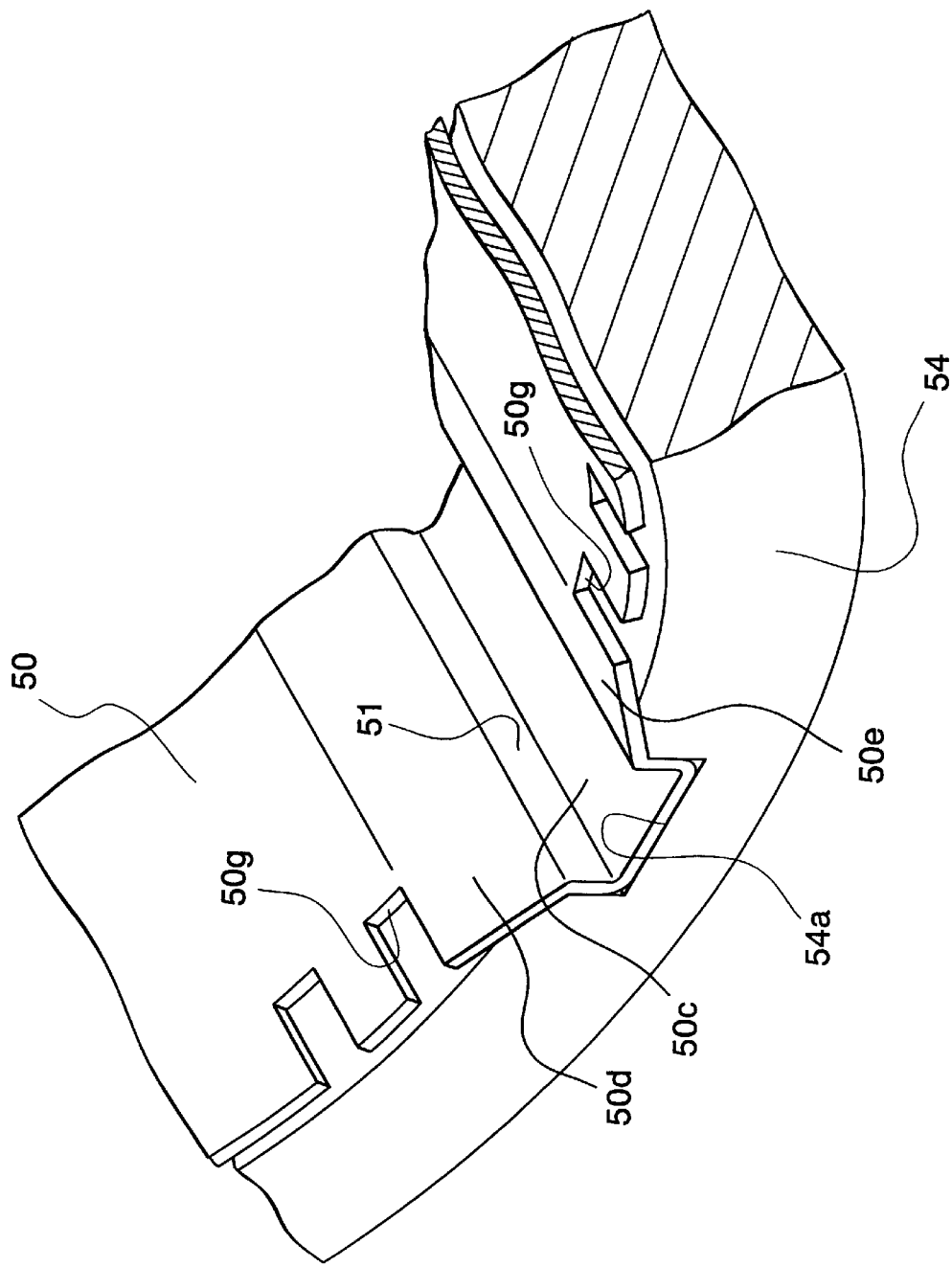
FIG. 11 is a schematic perspective view showing a modification of the seventh embodiment of a foil gas bearing according to the present invention.

Instead of the notch 50f which extends at the recess 50c, the inclined portions 50d and 50e, and the connection portions 50a, plural slit shaped notches 50g as shown in FIG. 11 may be formed at the back spring 50. The slit shaped notches 50g are preferably formed at the back spring 50 excepting the recesses 50c. For example, it is more preferable for the plural slit shaped notches 50g to be formed at the connection portion 50a.

According to the foil gas bearing comprising the slit shaped notches 50g, similar to the foil gas bearing comprising the notches 50f, the radial stiffness of the back spring 50 at both ends in the longitudinal direction thereof can be decreased. If the rotary shaft 20 inclines and a biasing stress is applied to the end of the back spring 50, since the radial stiffness at the end of the back spring 50 is relatively small, the back spring 50 can thereby deform flexibly in response to the biasing stress due to the rotary shaft 20. The back spring 50 and rotary shaft 20 thus make contact at a large contact area. Therefore, it is possible to avoid the rotary shaft 20 from applying a large stress to a local portion.

Moreover, the present invention is not limited to the above embodiments. Specifically, the protrusion formed at the rotary shaft retainer, back spring, and the top foil can be changed into a recess as far as the change of the constitution is within the scope of the present invention. Of course, as far as the change of the constitution is within the scope of the present invention, the recess formed at the rotary shaft retainer, back spring, and the top foil can be changed into a protrusion. Furthermore, it is also possible to vary the shape of the protrusion and the recess as long as a frictional force is generated between the protrusion and the recess.

In addition, the lubricants explained in the first embodiment can also be used in other embodiments.

In addition, the back spring is made of one element, that is, it has an integral structure in the above embodiments. However, the present invention can use a back spring comprising plural members. If a back spring comprising plural members is used, the assembly of the back spring into the foil gas bearing can be simplified.

Furthermore, the notches in the seventh embodiment may be applied to the back spring of the first to fifth embodiments. According to the foil gas bearings of the first to fifth embodiments, which further comprises the notches, the back spring can deform flexibly in response to a biasing stress due to the rotary shaft. Thereby, the back spring and rotary shaft contact at a large contact area. Therefore, it is possible to avoid the rotary shaft from applying a large stress to the a local portion.

Eighth Embodiment

Figure 12B:
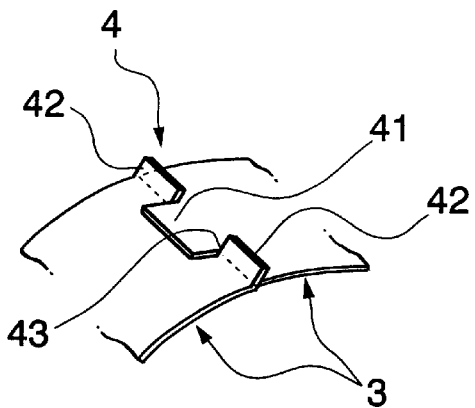
FIG. 12B is a schematic perspective view showing a connection portion along line A—A of FIG. 12A.

An eighth embodiment of the present invention will be explained with reference to FIGS. 12A and 12B.

In FIG. 12, reference number 1 denotes a rotary shaft retainer for retaining a rotary shaft, 20 denotes a rotary shaft which is not shown, 100 denotes a center of the rotary shaft 20, 2 denotes a top foil for preventing the displacement of the rotary shaft 20 in the radial direction thereof, which is provided around the rotary shaft 20, and 3 denotes a back spring for supporting the top foil 2, which is provided between the top foil 2 and the rotary shaft retainer 1.

Figure 12A:
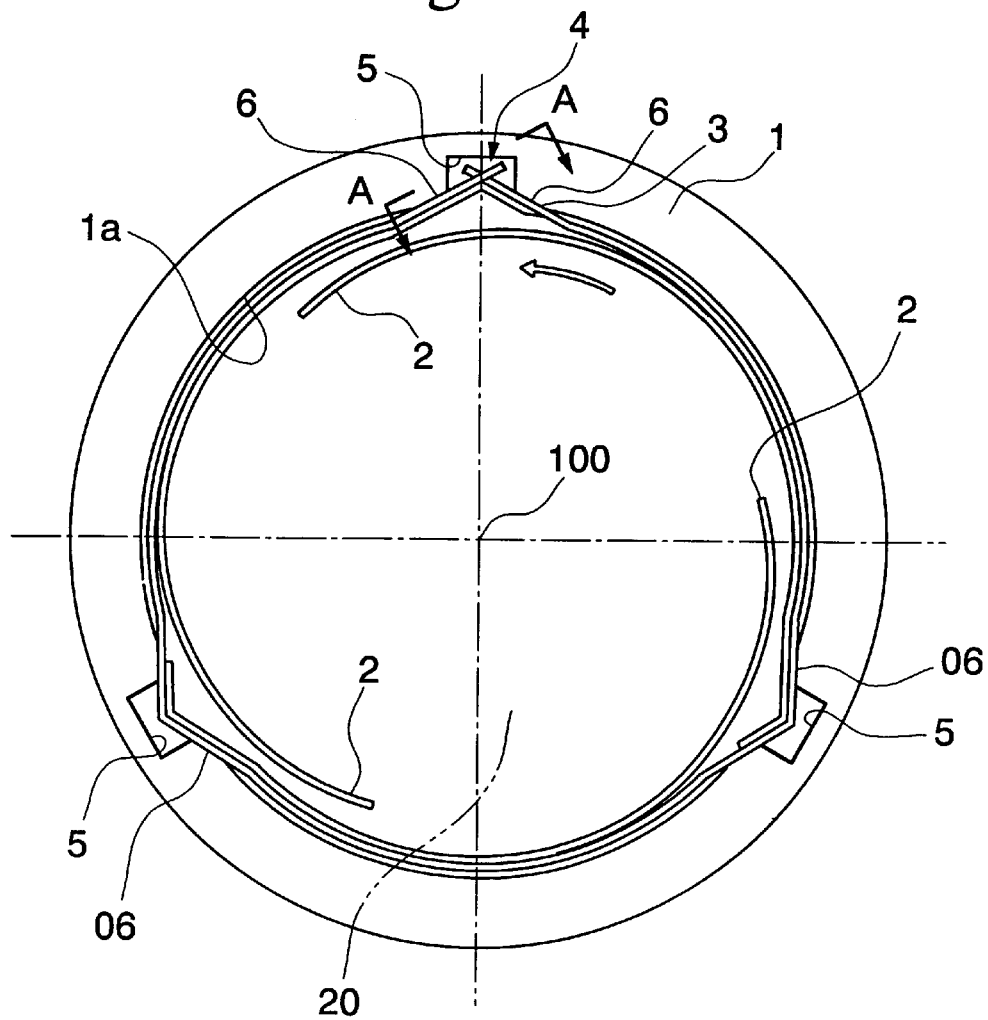
FIG. 12A is a front view showing an eighth embodiment of a foil gas bearing according to the present invention.

As shown in FIG. 12A, the rotary shaft retainer 1 comprises plural recesses 5 and inclined portions 6 each of which connects the recesses 5 at an inner surface 1a thereof. Moreover, the rotary shaft retainer 1 of this embodiment comprises three recesses 5 which are positioned so as to maintain a certain interval.

The back spring 3 has a ring shape formed by fixing both ends of a thin plate at a connection portion 4 under the conditions in which the back spring 3 has a tensile force. Specifically, as shown in FIG. 12B, the back spring 3 comprises one end having a protrusion portion 41 and the other end having a recess portion 42 which catches the protrusion portion 41. In addition, the width of the protrusion portion 41 substantially equals the width of the recess portion 42. Thereby, the side surfaces 43, that is, restriction surfaces, of the protrusion portion 41 contact the inner side surfaces 43, that is, the restriction surfaces, of the recess portion 42. As a result, the protrusion portion 41 cannot move in the width direction of the back spring 3 in the recess portion 42.

Since the rotary shaft retainer 1 comprises the inclined portions 6, when the back spring 3 is positioned inside of the rotary shaft retainer 1 so as to contact the connection portion 4 of the back spring 3 with the inclined portion 6 of the rotary shaft retainer 1, the position of the back spring 3 is fixed with respect to the rotary shaft retainer 1.

In addition, as shown in FIG. 12A, the back spring 3 has two protrusion portions 06, in addition to the connection portion 4. The protrusion portions 06 and the connection portion 4 have a wedged shape, which protrudes toward the rotary shaft retainer 1. Similar to the connection portion 4, the edge of the protrusion portion 06 is in the recess 5 and a part of the inclined portion of the protrusion portion 06 contacts the inclined portion 6 of the rotary shaft retainer 1. When the protrusion portion 06, which protrudes toward the rotary shaft retainer 1, is formed at the back spring 3, in addition to the connection portion 4, it is possible to fix more reliably fix the back spring 3 into the rotary shaft retainer 1.

The top foil 2 has a thin plate shape and comprises plural top foil elements 2 which are divided in the circumferential direction of the rotary shaft 20. One end of the top foil element 2 is bent so as to form a V-shaped base portion. The V-shaped base portion is fixed to the protrusion 06 of the back spring 3 so as to contact the inclined portions of the V-shaped base portion with the inclined portions of the protrusion 06.

In order to adjust a gap between the rotary shaft 20 and the top foil elements 2, the cross length between the protrusion portion 41 and the recess portion 42 of the back spring 3 is varied. In other words, when the cross point between the restriction surfaces 43 of the protrusion portion 41 and the restriction surfaces 43 of the recess portion 42 is varied, the circumferential distance of the back spring 3 can be easily adjusted.

According to the foil gas bearing of this embodiment, it is possible for the back spring 3 to be provided stably in the rotary shaft retainer 1 without a part of the back spring 3 contacting the inner surface 1a of the rotary shaft retainer 1.

In addition, when the circumferential distance of the back spring varies 3, since the V-shaped base portion of the top foil element 2 is fixed to protrusion portion 06 of the back spring 3, the position of the top foil element 2 changes in the radial direction of the rotary shaft 20. Therefore, it is possible to maintain the gap between the rotary shaft 20 and the top foil 2 at an appropriate distance by adjusting the circumferential distance of the back spring 3.

Furthermore, the back spring 3 is fixed into the rotary shaft retainer 1 only by contacting the inclined portions of the connection portion 4 and the protrusion portions 06 with the inclined portions 6 of the rotary shaft retainer 1. Therefore, the assembly of the back spring 3 into the rotary shaft retainer 1 is easy. In addition, the back spring 3 can be fixed to the rotary shaft retainer 1 with high precision.

Ninth Embodiment

A ninth embodiment of the present invention will be explained with reference to FIG. 13. The explanation will center on the characteristic parts, and parts which are identical to those in the eighth embodiment will not be explained further.

Figure 13:
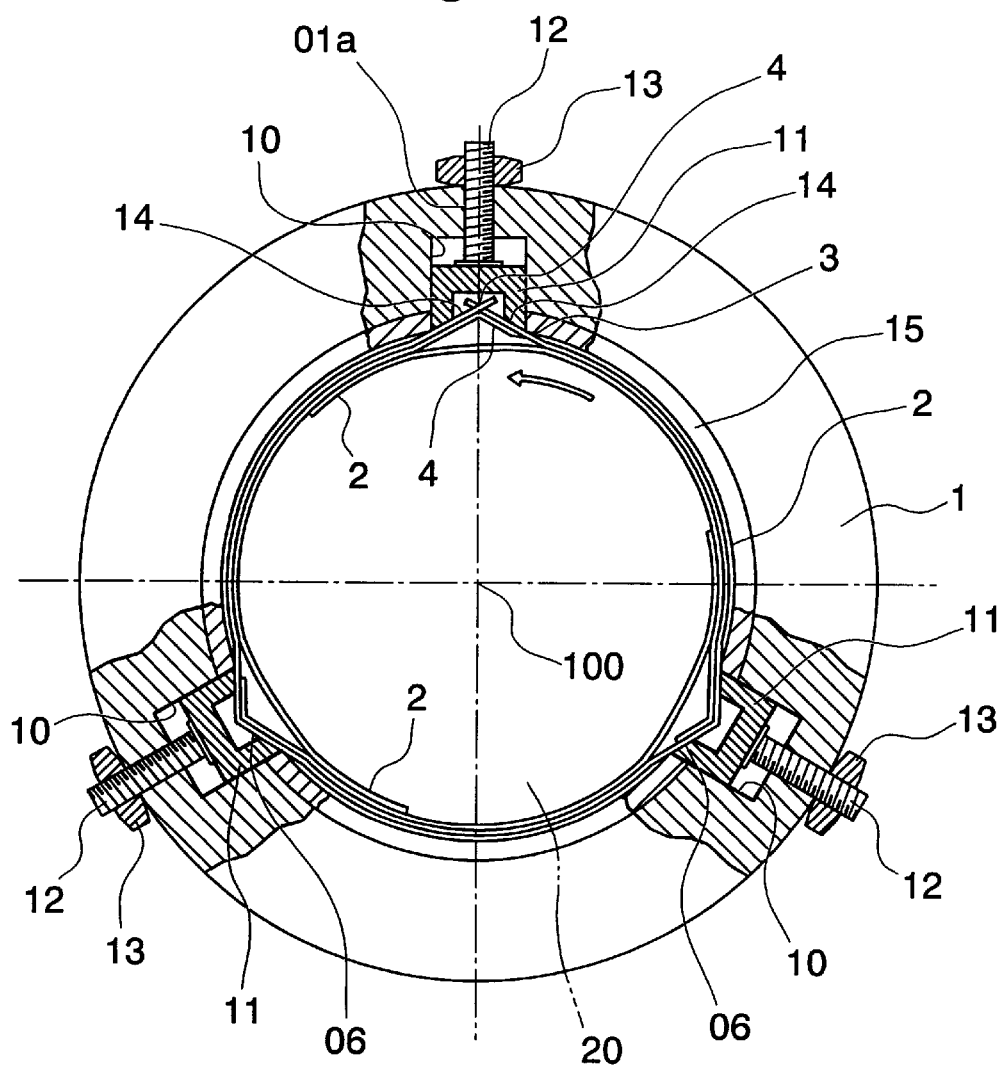
FIG. 13 is a schematic cross-sectional view showing a ninth embodiment of a foil gas bearing according to the present invention.

The foil gas bearing shown in FIG. 13 further comprises plural back spring diameter adjusting mechanisms. Each back spring diameter adjusting mechanism comprises an adjusting groove 10 and a pressing piece 11.

The adjusting groove 10 is provided at the inner surface of the rotary shaft retainer 1 and which extends outwardly in the radial direction of the rotary shaft 20. The pressing piece 11 is provided in the adjusting groove 10 and moves outwardly and inwardly in the radial direction of the rotary shaft 20.

The pressing piece 11 comprises a recess 4 which opens toward the rotary shaft 20 and in which the edge of the connection portion 4 of the back spring 3 is positioned. In addition, tapered portions 14, which contact the connection portion 4 of the back spring 3, are formed at the both sides of the recess 4 in the circumferential direction of the rotary shaft retainer 1.

In addition, the rotary shaft retainer 1 comprises thread holes 10a which connect with the adjusting groove 10. In the thread hole 10a, an adjusting screw 12 is inserted such that the tip of the adjusting screw 12 contacts the pressing piece 11 which is in the adjusting groove 10.

Moreover, in FIG. 13, reference number 15 denotes an inner ring which is provided at the inner surface of the rotary shaft retainer 1. The adjusting groove 10 passes through the inner ring 15. In addition, in FIG. 13, reference number 13 denotes a nut for the adjusting screw 12.

The back spring 3 is fixed in the rotary shaft retainer 1 by positioning the edge of the connection portion 4 and the protrusion portions 06 into the adjusting groove 10, and contacting the inclined portions of the connection portion 4 and the protrusion portions 06 with the tapered portions 14 of the pressing piece 11.

According to the foil gas bearing of this embodiment, when the adjusting screw 12 is screwed in using the nut 13, the pressing piece 11 is pushed by the adjusting screw 12. The pressing piece 11 moves toward the rotary shaft 20 in the adjusting groove 10, and presses the back spring 3 at the tapered portion 14. Specifically, the tapered portion 14 contacts the connection portion 4 of the back spring 3. When the tapered portion 14 presses the connection portion 4, the cross point between the protrusion portion 41 and the recess portion 42 is varied and the cross length between the protrusion portion 41 and the recess portion 42 is decreased. The circumferential distance of the back spring 3 is thereby increased. The diameter of the back spring is also increased. When the circumferential distance and the diameter of the back spring 3 is increased, the overlapped part of the top foil elements 2 is decreased, and thereby the gap between the top foil element 2 and the rotary shaft 20 is increased. In contrast, when the adjusting screw 12 is unscrewed using the nut 13, the pressing piece 11 moves outwardly into the adjusting groove 10. Because the back spring 3 contacts the pressing piece 11 under conditions in which the back spring 3 has a tensile force, when the pressing piece 11 moves outwardly, the cross length between the protrusion portion 41 and the recess portion 42 is increased. Thereby, the circumferential distance of the back spring 3 is decreased, and the diameter of the back spring 3 is also decreased. When the diameter and the circumferential distance of the back spring 3 is decreased, the overlapped part of the top foil elements 2 and 2 is increased, and thereby the gap between the top foil element 2 and the rotary shaft 20 is decreased.

In other words, according to the foil gas bearing of this embodiment, the gap between the top foil element 2 and the rotary shaft 20 can be adjusted easily by the back spring diameter adjusting mechanism.

In addition, the gap between the rotary shaft 20 and the top foil 2 can be adjusted even after the rotary shaft 20, the top foil 2, the back spring 3, and the like are provided in the rotary shaft retainer 1, and thereby the foil gas bearing is assembled.

In addition, the gap between the rotary shaft 20 and the top foil 2 can be adjusted with higher precision by adjusting the position of the pressing piece 11.

Furthermore, the assembling steps for the foil gas bearing and the adjusting steps for the gap between the rotary shaft 20 and the top foil 2 can be decreased.

Tenth Embodiment

A tenth embodiment of the present invention will be explained with reference to FIG. 14. The explanation will center on the characteristic parts, and parts which are identical to those in the eighth embodiment will not be explained further.

Figure 14:
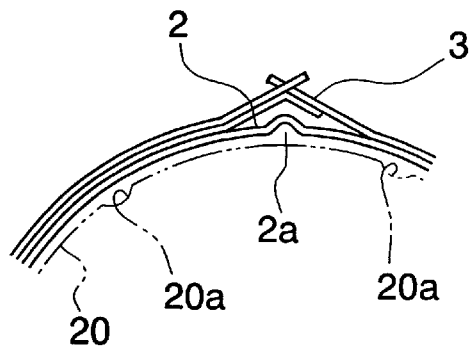
FIG. 14 is an enlarged view showing a connection portion of a tenth embodiment of a foil gas bearing according to the present invention
Figure 15:
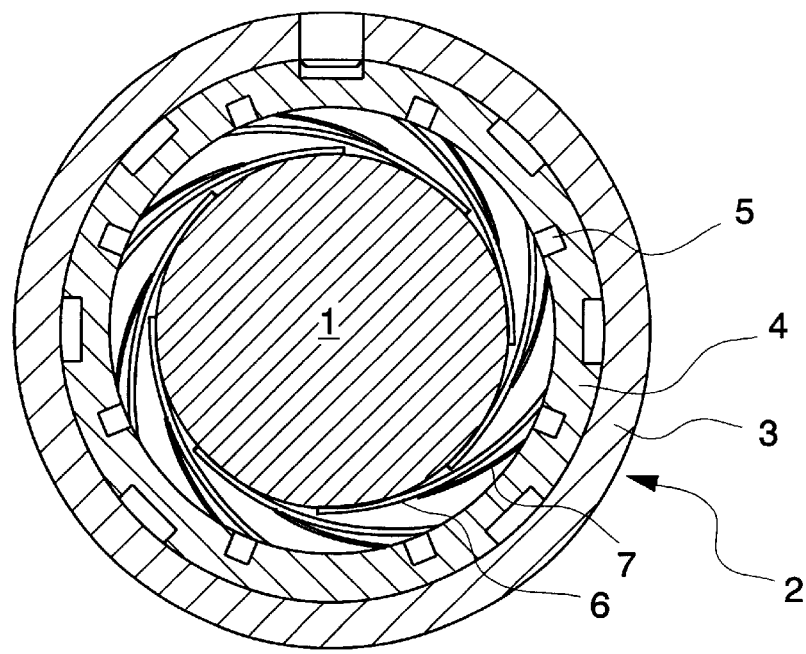
FIG. 15 is a schematic cross-sectional view showing a conventional embodiment of a foil gas bearing.
Figure 16:
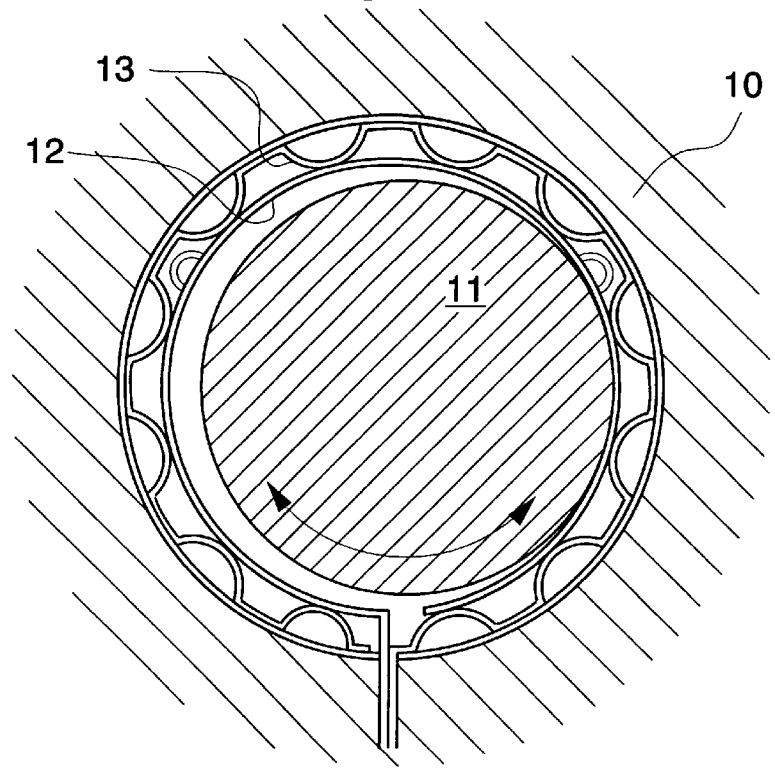
FIG. 16 is a schematic cross-sectional view showing another conventional embodiment of a foil gas bearing.

In the foil gas bearing shown in FIG. 14, the top foil element 2 further comprises plural dimples, that is plural recesses 2a, at the inner surface thereof. The recesses 2a protrude outwardly in the radial direction of the rotary shaft 20. The recesses 2a are preferably aligned in the circumferential direction of the rotary shaft 20. Instead of the recesses 2a of the top foil element 2, the rotary shaft 20 may comprise the plural recesses 20a at the surface. In addition, it is also possible for the foil gas bearing to comprise the recesses 2a of the top foil 2 and the recesses 20a of the rotary shaft 20.

According to the foil gas bearing of this embodiment, since a solid lubricant can be provided in the recesses 2a and 20a, the surface of the rotary shaft 20 can be lubricated. Therefore, while the rotary shaft 20 contacts the top foil 2, such as during starting, during low revolutions, and the like, it is possible to avoid abrasion loss of the rotary shaft 20 and the top foil 2 from increasing.

Eleventh Embodiment

In the foil gas bearing structure of this embodiment, the surface of the rotary shaft was coated with a hard carbon, and the top foil was coated with a calcination film containing fluororesin (PTFE calcination film). In addition, in order to compared the foil gas bearing structure of this embodiment with a conventional foil gas bearing structure, a conventional foil gas bearing structure was prepared, which comprises the rotary shaft of which the surface is chrome plated and the top foil which is coated with a calcination from containing fluororesin. The coefficient of friction and the abrasion loss of these foil gas bearing structures were measured at room temperature and 200° C. The results are shown in the following Table 1.

TABLE 1

| Coating | | Coefficient of friction | | Abrasion loss ($\mu$m) | | |
|---|---|---|---|---|---|---|
| Rotary shaft | Top foil | Room temperature | 200° C. | Room temperature | 200° C. | Other |
| 1 Chrome plating | PTFE calcination film | 0.3 | 0.4 | 12 | 14 | C.I. |
| 2 Hard carbon | PTFE calcination film | 0.2 | 0.1 | 5 | 4 | P.I. |

In Table 1, C.I. denotes the foil gas bearing belonging to the conventional invention, and P.I. denotes the foil gas bearing belonging to the present invention.

As shown in Table 1, the foil gas bearing structure (No. 2) of this embodiment has a coefficient of friction and the abrasion loss at both room temperature and 200° C., smaller than those of the conventional foil gas bearing structure (No. 1).

According to the foil gas bearing structure of this embodiment, since a hard carbon film has solid lubricating properties which are greater than those of a chromium plating film and a ceramic film, a hard carbon film is a suitable for coating the surface of the rotary shaft. When the surface of the rotary shaft is coated with a hard carbon and the top foil is coated with a calcination film containing fluororesin, transitional lubricating effects can be obtained between the surface of the rotary shaft and the surface of the top foil. In other words, the lubricant at the rotary shaft easily transfers to the surface of the top foil. Therefore, the abrasion resistance of the foil gas bearing is improved, and the service life of the foil gas bearing increases.

Twelfth Embodiment

In this embodiment, the foil gas bearings, in which the top foils were coated with the materials in the following Table 2 and the rotary shafts were coated with no material, were obtained. In the following Table 2, the foil gas bearings of this embodiment are numbered 4 to 14. In addition, in order to compare the foil gas bearing of this embodiment with conventional foil gas bearings, conventional foil gas bearings numbered 1 to 3, and 15 in the following Table 2 were also prepared.

The coefficient of friction and the abrasion loss of these foil gas bearings were measured at room temperature, 200° C., 400° C., and 600° C. The results were shown in the following Table 2.

TABLE 2

| | | Coefficient of Friction | | | | Abrasion Loss ($\mu$m) | | | | |
|---|---|---|---|---|---|---|---|---|---|---|
| | Top foil Coating | Room Temperature | 200° C. | 400° C. | 600° C. | Room Temperature | 200° C. | 400° C. | 600° C. | Other |
| 1 | No | 0.8 | 0.9 | 0.9 | 1 | 30 | 34 | 43 | 54 | C.I. |
| 2 | PTFE | 0.3 | 0.4 | 0.9 | 1 | 14 | 15 | All | All | C.I. |
| 3 | BN | 0.7 | 0.6 | 0.6 | 0.6 | All | All | All | 19 | C.I. |
| 4 | $MoS_2$ | 0.3 | 0.3 | 0.4 | 0.5 | 8 | 12 | 18 | 19 | P.I. |
| 5 | graphite | 0.5 | 0.5 | 0.3 | 0.4 | 19 | 18 | 14 | 13 | P.I. |
| 6 | graphite + $MoS_2$ | 0.3 | 0.4 | 0.4 | 0.5 | 9 | 11 | 11 | 10 | P.I. |
| 7 | $K_2WO_4$ | 0.4 | 0.5 | 0.4 | 0.3 | 12 | 13 | 11 | 11 | P.I. |
| 8 | $Na_2WO_4$ | 0.4 | 0.5 | 0.4 | 0.4 | 12 | 14 | 12 | 11 | P.I. |
| 9 | $K_2MoO_4$ | 0.5 | 0.4 | 0.4 | 0.4 | 14 | 14 | 13 | 13 | P.I. |
| 10 | $Na_2MoO_4$ | 0.5 | 0.4 | 0.3 | 0.3 | 13 | 14 | 12 | 12 | P.I. |
| 11 | graphite + $K_2WO_4$ | 0.3 | 0.3 | 0.2 | 0.2 | 8 | 8 | 7 | 7 | P.I. |
| 12 | graphite + $Na_2WO_4$ | 0.3 | 0.2 | 0.2 | 0.2 | 8 | 7 | 7 | 7 | P.I. |
| 13 | graphite + $K_2MoO_4$ | 0.3 | 0.3 | 0.3 | 0.2 | 9 | 9 | 9 | 8 | P.I. |
| 14 | graphite + $Na_2MoO_4$ | 0.3 | 0.3 | 0.3 | 0.3 | 9 | 9 | 9 | 9 | P.I. |
| 15 | $Cr_2O_3$ | 0.8 | 0.8 | 0.7 | 0.6 | 3 | 3 | 2 | 2 | C.I. |

In the Table 2, C.I. denotes the foil gas bearing belonging to the conventional invention, and P.I. denotes the foil gas bearing belonging to the present invention.

The top foil of the foil gas bearings numbered 4 to 6 in the Table 2 is coated with a film containing at least one selected from the group consisting of graphite and molybdenum disulfide ($MOS_2$). In addition, the top foil of the foil gas bearings numbered 7 to 10 in the Table 2 is coated with a film containing at least two metallic oxides. Furthermore, the top foil of the foil gas bearings numbered 11 to 14 is coated with a film containing graphite and at least two metallic oxides.

As shown in the Table 2, the foil gas bearings of the present invention, that is, the foil gas bearings numbered 4 to 14, have the coefficient of friction and the abrasion loss at both the room temperature and the high temperatures, such as 200° C., 400° C., and 600° C., which are smaller than those of the conventional foil gas bearings numbered 1 to 3, and 15. In particular, the foil gas bearings of the present invention have the coefficient of friction and the abrasion loss at 600° C., which substantially equal those at the room temperature.

When the foil gas bearing starts or stops, the rotary shafts rotates at low revolutions. Therefore the top foil contacts the rotary shaft. However, since the foil gas bearing of this embodiment has a coefficient of friction and abrasion loss at 600° C., substantially equal to those at the room temperature, it is possible to maintain a low coefficient of friction and the abrasion loss low from room temperature to high temperatures, such as 600° C.

According to the foil gas bearing of this embodiment, even when the top foil contacts the rotary shaft, for example, during low revolutions, such as during starting and during stopping, it is possible to avoid abrasion loss of the rotary shaft and the top foil from increasing over such a wide temperature range. In addition, since the maximum allowable temperature of the top foil increases, it is possible to use the foil gas bearings comprising the top foil with elements for gas turbines which are subjected to high temperatures.

What is claimed is:

1. A foil gas bearing comprising:

a rotary shaft retainer for retaining a rotary shaft; and a back spring for preventing the displacement of said rotary shaft, which is provided between said rotary shaft and said rotary shaft retainer;

wherein said rotary shaft retainer comprises plural recesses of which the cross section is quadrangular;

said back spring comprises plural recesses that enter inside of said recesses of said rotary shaft retainer, connection portions between said recesses, and peripheral inclined portions of each which connects and separates one said of said recesses and one of said connection portions as they extend toward said rotary shaft so as to form a gap between the outer surface of said back spring and the inner surface of said rotary shaft retainer; and said back spring comprises plural notches at both ends in the longitudinal direction thereof, which notches extend toward the center of said back spring in the longitudinal direction and each of which is formed at said recess and said peripheral inclined portions and a part of said connection portion.

2. A foil gas bearing according to claim 1, further comprising:

plural top foil elements for supporting said rotary shaft, provided between said rotary shaft and said back spring;

wherein each of said top foil elements comprises a wedge portion comprising an edge and two inclined portions extending from the edge toward said rotary shaft at one end and an extending portion which extends from said wedge portion so as to surround said rotary shaft; and said top foil elements are provided inside of said back spring so that said edge of said wedge portion is inside of said recess of said back spring and inclined portions of said wedge portion contact said peripheral inclined portions of said back spring.

3. A foil gas bearing comprising:
a rotary shaft retainer for retaining a rotary shaft; and
a back spring for preventing the displacement of said rotary shaft, which is provided between said rotary shaft and said rotary shaft retainer;
wherein said rotary shaft retainer comprises plural recesses of which the cross section is quadrangular;
said back spring comprises plural recesses that enter inside of said recesses of said rotary shaft retainer, connection portions between said recesses, and peripheral inclined portions each of which connects and separates one of said recesses and one of said connection portions as they extend toward said rotary shaft so as to form a gap between the outer surface of said back spring and the inner surface of said rotary shaft retainer; and
said back spring comprises plural notches at both ends in the longitudinal direction thereof, which notches extend toward the center of said back spring in the longitudinal direction and are formed at said connection portion.

4. A foil gas bearing according to claim 3, further comprising:
plural top foil elements for supporting said rotary shaft, provided between said rotary shaft and said back spring;
wherein each of said top foil elements comprises a wedge portion comprising an edge and two inclined portions extending from said edge toward said rotary shaft at one end and an extending portion which extends from said wedge portion so as to surround said rotary shaft; and
said top foil elements are provided inside of said back spring so that said edge of said wedge portion is inside of said recess of said back spring and inclined portions of said wedge portion contact said peripheral inclined portions of said back spring.

5. A foil gas bearing for retaining a rotary shaft, comprising:
a rotary shaft retainer for retaining the rotary shaft;
a back spring for preventing displacement of said rotary shaft, said back spring being provided between said rotary shaft and said rotary shaft retainer; and
a top foil for preventing displacement of said rotary shaft in a radial direction thereof, said top foil being provided between said rotary shaft and said back spring;
wherein said back spring comprises plural protrusions;
wherein said rotary shaft retainer comprises plural recesses;
wherein said protrusions of said back spring at least partially fit into said recesses of said rotary shaft retainer;
wherein said back spring is provided in said rotary shaft retainer such that a gap is maintained between an outer surface of said back spring and an inner surface of said rotary shaft retainer between said recesses of said rotary shaft retainer;
wherein said top foil comprises plural top foil elements spaced in a circumferential direction of the rotary shaft;
wherein each said top foil element comprises a protrusion at one end thereof which protrudes toward the inside of one of said protrusions of said back spring; and
wherein said protrusion of each said top foil element partially fits into the inside of said one of said protrusions of said back spring.

6. A foil gas bearing structure comprising:
a rotary shaft; and
a foil gas bearing according to claim 5,
wherein said rotary shaft is coated with a hard carbon and said top foil is coated with a calcination film containing fluororesin.

7. The foil gas bearing of claim 5, wherein a solid lubricant is coated at the outer surface of said back spring, the inner surface of said rotary shaft retainer and said top foil.

8. The foil gas bearing according to claim 5, wherein said top foil is coated with a film containing at least one selected from the group consisting of graphite and molybdenum disulfide.

9. The foil gas bearing according to claim 5, wherein said top foil is coated with a film containing at least two metallic oxides.

10. The foil gas bearing according to claim 5, wherein said top foil is coated with a film containing graphite and at least two metallic oxides.

11. A foil gas bearing for retaining a rotary shaft, comprising:
a rotary shaft retainer for retaining the rotary shaft;
a back spring for preventing displacement of said rotary shaft, said back spring being provided between said rotary shaft and said rotary shaft retainer; and
a top foil for preventing displacement of said rotary shaft in a radial direction thereof, said top foil being provided between said rotary shaft and said back spring;
wherein said back spring comprises plural protrusions;
wherein said rotary shaft retainer comprises plural recesses;
wherein said protrusions of said back spring at least partially fit into said recesses of said rotary shaft retainer; and
wherein said back spring comprises notches at both longitudinal ends of said back spring, said notches extending toward the center of the axial line of the rotary shaft.

12. A foil gas bearing structure comprising:
a rotary shaft; and
a foil gas bearing comprising:
a rotary shaft retainer for retaining the rotary shaft;
a back spring for preventing displacement of said rotary shaft, said back spring being provided between said rotary shaft and said rotary shaft retainer; and
a top foil for preventing displacement of said rotary shaft in a radial direction thereof, said top foil being provided between said rotary shaft and said back spring;
wherein said back spring comprises plural protrusions;
wherein said rotary shaft retainer comprises plural recesses;
wherein said protrusions of said back spring at least partially fit into said recesses of said rotary shaft retainer;
wherein said rotary shaft is coated with a solid lubricant;
wherein said back spring is provided in said rotary shaft retainer such that a gap is maintained between an outer surface of said back spring and an inner surface of said rotary shaft retainer between said recesses of said rotary shaft retainer;
wherein said top foil comprises plural top foil elements spaced in a circumferential direction of the rotary shaft;

wherein each said top foil element comprises a protrusion at one end thereof which protrudes toward the inside of one of said protrusions of said back spring; and wherein said protrusion of each said top foil element partially fits into the inside of said one of said protrusions of said back spring.

13. A foil gas bearing structure comprising:

a rotary shaft; and a foil gas bearing comprising:

a rotary shaft retainer for retaining the rotary shaft;

a back spring for preventing displacement of said rotary shaft, said back spring being provided between said rotary shaft and said rotary shaft retainer;

wherein said back spring comprises plural protrusions;

wherein said rotary shaft retainer comprises plural recesses;

wherein said protrusions of said back spring at least partially fit into said recesses of said rotary shaft retainer;

wherein said rotary shaft is coated with a solid lubricant; and wherein said back spring comprises notches at both longitudinal ends of said back spring, said notches extending toward the center of the axial line of the rotary shaft.

* * * * *